United States Patent
Kim et al.

(10) Patent No.: US 9,820,160 B2
(45) Date of Patent: *Nov. 14, 2017

(54) METHOD AND APPARATUS FOR TRANSCEIVING A CONTACT VERIFICATION SIGNAL IN A WIRELESS COMMUNICATION SYSTEM

(71) Applicant: LG Electronics Inc., Seoul (KR)

(72) Inventors: Eunsun Kim, Gyeonggi-do (KR); Jihyun Lee, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 35 days.

This patent is subject to a terminal disclaimer.

(21) Appl. No.: 14/965,888

(22) Filed: Dec. 10, 2015

(65) Prior Publication Data

US 2016/0100319 A1    Apr. 7, 2016

Related U.S. Application Data

(63) Continuation of application No. 13/980,618, filed as application No. PCT/KR2012/000424 on Jan. 18, 2012, now Pat. No. 9,220,119.

(Continued)

(51) Int. Cl.
*H04W 4/00* (2009.01)
*H04W 16/14* (2009.01)
(Continued)

(52) U.S. Cl.
CPC ......... *H04W 16/14* (2013.01); *H04W 72/042* (2013.01); *H04W 72/0453* (2013.01); *H04W 76/02* (2013.01); *H04W 84/18* (2013.01)

(58) Field of Classification Search
CPC ............. H04W 16/14; H04W 72/0453; H04W 72/042; H04W 84/18; H04W 76/02
See application file for complete search history.

(56) References Cited

U.S. PATENT DOCUMENTS 6,842,460 B1 *  1/2005  Olkkonen ............. H04W 48/16
                                                    370/328
8,749,638 B2    6/2014  Charbit et al.
(Continued)

FOREIGN PATENT DOCUMENTS

WO    2012/097343 A1    7/2012
WO    2012/109608 A1    8/2012

OTHER PUBLICATIONS

Yoon, et al., "Cross-Layer Dynamic Spectrum Map Management Framework for White Space Applications," EURASIP Journal on Wireless Communications and Networking, vol. 2010, Feb. 2010, pp. 1-16.

(Continued)

*Primary Examiner* — Robert Wilson
(74) *Attorney, Agent, or Firm* — Morgan, Lewis & Bockius LLP

(57) ABSTRACT

The present document related to a method and apparatus for transceiving a signal capable of verifying the validity of an available channel in a wireless communication system. According to the present invention, a scheme for transceiving available channel information, a scheme for requesting/responding to a channel validity inquiry, and a scheme for transceiving a contact verification signal are provided, and accordingly, a scheme for supporting the accurate and efficient operation of an unlicensed device while protecting a licensed device in a whitespace band is provided.

15 Claims, 10 Drawing Sheets

Related U.S. Application Data

(60) Provisional application No. 61/508,074, filed on Jul. 15, 2011, provisional application No. 61/433,970, filed on Jan. 19, 2011.

(51) Int. Cl.
*H04W 76/02* (2009.01)
*H04W 84/18* (2009.01)
*H04W 72/04* (2009.01)

(56) References Cited

U.S. PATENT DOCUMENTS

| | | | |
|---|---|---|---|
| 9,220,119 B2 * | 12/2015 | Kim | H04W 16/14 |
| 9,332,484 B2 * | 5/2016 | Kim | H04W 48/16 |
| 2010/0246506 A1 | 9/2010 | Krishnaswamy | |
| 2011/0280180 A1 | 11/2011 | McCann et al. | |
| 2012/0282959 A1 * | 11/2012 | Abraham | H04L 5/0096 455/500 |
| 2013/0016670 A1 | 1/2013 | Shellhammer et al. | |
| 2013/0040579 A1 | 2/2013 | Wentink et al. | |
| 2013/0072106 A1 | 3/2013 | Koskela et al. | |
| 2013/0231108 A1 * | 9/2013 | Kim | H04W 48/16 455/434 |
| 2013/0294436 A1 * | 11/2013 | Kim | H04W 16/14 370/338 |
| 2013/0303128 A1 | 11/2013 | Wang et al. | |
| 2016/0100319 A1 * | 4/2016 | Kim | H04W 16/14 370/329 |

OTHER PUBLICATIONS

Baykas, et al., "Overview of TV White Spaces: Current Regulations, Standards and Coexistence between Secondary Users," 2010 IEEE 21st International Symposium on Personal, Indoor and Mobile Radio Communications Workshops, pp. 38-43, Sep. 30, 2010.

Written Opinion and International Search Report issued in corresponding International Patent Application No. PCT/KR2012/000424 dated Sep. 27, 2012.

* cited by examiner

FIG. 6
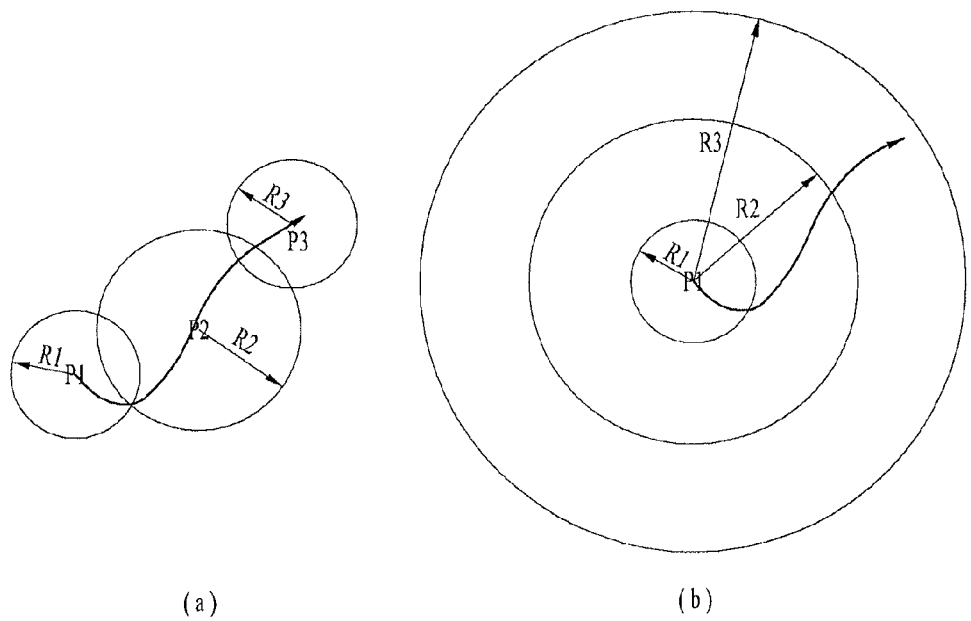
(a)                    (b)
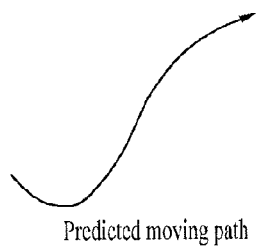
Predicted moving path
FIG. 7
| | | | | | These three fields can be repeated | | |
| --- | --- | --- | --- | --- | --- | --- | --- |
| Category | Public Action | Reason Result Code | Length | Map ID | Channel number | Maximum Power level | validity |
| Octets: 1 | 1 | 1 | 1 | 1 | 1 | 1 | 1 |

FIG. 9

| Category | Public Action | Reason Result Code | Number of locations | Length | Map ID | Channel number | Maximum Power level | validity |
|---|---|---|---|---|---|---|---|---|
| 1 | 1 | 1 | 1 | 1 | 1 | 1 | 1 | 1 |

Octets:

These three fields can be repeated by N

These fields can be repeated by K

METHOD AND APPARATUS FOR TRANSCEIVING A CONTACT VERIFICATION SIGNAL IN A WIRELESS COMMUNICATION SYSTEM

CROSS REFERENCE TO RELATED APPLICATIONS

The present application is a continuation of U.S. patent application Ser. No. 13/980,618, filed on Jul. 19, 2013, the entire disclosure of which is hereby incorporated by reference for all purposes as if fully set forth herein. U.S. patent application Ser. No. 13/980,618 is a U.S. National Stage Entry of PCT International Application No. PCT/KR2012/000424, filed on Jan. 18, 2011, and claims the benefit of U.S. Provisional Applications No. 61/508,074, filed on Jul. 15, 2011 and No. 61/433,970, filed on Jan. 19, 2011.

TECHNICAL FIELD

The following description relates to a method of transceiving a contact verification signal in a wireless communication system.

BACKGROUND ART

A standard for a wireless local area network (WLAN) technology has been developed as IEEE (Institute of Electrical and Electronics Engineers) 802.11 standard. IEEE 802.11a or IEEE 802.11b uses an unlicensed band in 2.4 GHz or 5 GHz, IEEE 802.11b provides transmission speed of 11 Mbps and IEEE 802.11a provides transmission speed of 54 Mbps. IEEE 802.11g provides transmission speed of 54 Mbps in a manner of applying Orthogonal Frequency Division Multiplexing (OFDM) in 2.4 GHz. IEEE 802.11n provides transmission speed of 300 Mbps for 4 spatial streams in a manner of applying Multiple Input Multiple Output-OFDM (MIMO-OFDM). IEEE802.11n supports a channel bandwidth up to 40 MHz. In this case, IEEE802.11n provides transmission speed of 600 Mbps.

IEEE 802.11af standard is a standard set to regulate an operation of an unlicensed device in a TV whitespace (TVWS) band.

The TVWS is a frequency assigned to a broadcast TV and includes an Ultra High Frequency (UHF) band and a Very High Frequency (VHF). The TVWS means a frequency band permitted to an unlicensed device to use under a condition that the unlicensed device does not impede a communication of a licensed device operating in a corresponding frequency band. The licensed device can include a TV, a wireless microphone, and the like. The licensed device can be called an incumbent user or a primary user. And, in order to solve a coexistence problem between unlicensed devices using the TVWS, it may be necessary to have such a signaling protocol as a common beacon frame and the like, frequency sensing mechanism, and the like.

Although operations of all unlicensed devices are permitted on 512~608 MHz and 614~698 MHz except several special cases, a communication between fixed devices is only permitted on 54~60 MHz, 76~88 MHz, 174~216 MHz, 470~512 MHz. A fixed device indicates a device performing a signal transmission at a fixed position only. IEEE 802.11 TVWS terminal means an unlicensed device operating by using IEEE 802.11 MAC (media access control) and a physical layer (PHY) in a TVWS spectrum.

The unlicensed device wishing to use the TVWS should provide a protection function for a licensed device. Hence, the unlicensed device should check whether the licensed device occupies a corresponding band before starting a signal transmission in the TVWS.

To this end, the unlicensed can check whether the corresponding band is used by the licensed device in a manner of performing a spectrum sensing. A spectrum sensing mechanism includes an energy detection scheme, a feature detection scheme, and the like. If strength of a signal received from a specific channel is greater than a certain value or a DTV preamble is detected, the unlicensed device can judge that the specific channel is currently used by the licensed device. And, if it is judged that the licensed device currently uses a channel adjacent to the channel currently used, the unlicensed device should lower a transmit power.

And, the unlicensed device should obtain channel list information capable of being used by the unlicensed device in a corresponding area in a manner of accessing a database (DB) via the internet or a dedicated network. The DB is a database storing and managing information on the licensed device registered in the DB and a channel use information, which dynamically varies according to a geographical location of the corresponding licensed devices and hours of use.

In explaining the present specification, a white space band includes the aforementioned TVWS, by which the present invention may be non-limited. In the present specification, a terminology of white space band means a band preferentially permitting an operation of the licensed device and the band permitting an operation of the unlicensed device only when a protection for the licensed device is provided. And, a white space device means a device operating in the white space band. For instance, a device according to an IEEE 802.11 system may become an example of the white space device. In this case, the white space device may indicate the unlicensed device operating in the white space band using the IEEE 802.11 MAC (Medium Access Control) layer and the PHY (Physical) layer. In particular, a general AP according to 802.11 standard and/or an STA operating in the white space band may correspond to an example of the unlicensed device.

DISCLOSURE OF THE INVENTION

Technical Tasks

As mentioned in the foregoing description, since a channel available to the unlicensed device in the whitespace can dynamically vary according to a time, the unlicensed device should be able to check whether the available channel is valid.

After the information on the available channel is given to the unlicensed device, a process of checking whether a corresponding channel is still available for the unlicensed device to use can be performed as well. The process can be called a contact verification and a signal used for the process is called a contact verification signal (CVS).

Hence, a technical task of the present invention is to provide a method of efficiently constructing a CVS indicating the validity of an available channel for the unlicensed device in the white space band. And, another technical task of the present invention is to provide a method of efficiently constructing a message to request and respond for information on the channel available to the unlicensed device.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment of the present invention, a method of receiving a verification signal, which is received by a first station (STA) from a second STA in a wireless communication system includes the steps of receiving information on a white space map (WSM) from the second STA before operating in a white space band, receiving a contact verification signal (CVS) frame including a map identifier (Map ID) of a currently valid WSM from the second STA, and comparing a value of the Map ID field included in the CVS frame with a Map ID possessed by the first STA, wherein the CVS frame further includes a field indicating a time interval of which the CVS frame is transmitted from the second STA and wherein the CVS frame is received on the every time interval of a CVS transmission.

To achieve these and other advantages and in accordance with the purpose of the present invention, as embodied and broadly described, according to a different embodiment of the present invention, a method of transmitting a verification signal, which is transmitted by a second station (STA) to a first STA in a wireless communication system includes the steps of transmitting information on a white space map (WSM) to the first STA before the first STA operates in a white space band and transmitting a contact verification signal (CVS) including a map identifier (Map ID) of a currently valid WSM to the first STA, wherein a value of the Map ID field included in the CVS frame and a Map ID possessed by the first STA are compared with each other in the first STA, wherein the CVS frame further includes a field indicating a time interval of which the CVS frame is transmitted from the second STA, and wherein the CVS frame is received on the every time interval of a CVS transmission.

In order to solve the aforementioned technical task, according to a different embodiment of the present invention, a first station (STA) device configured to receive a verification signal from a second station (STA) in a wireless communication system includes a transceiver configured to receive information on a white space map (WSM) from the second STA before operating in a white space band and configured to receive a contact verification signal (CVS) frame including a map identifier (Map ID) of a currently valid WSM from the second STA and a processor configured to compare a value of the Map ID field included in the CVS frame with a Map ID possessed by the first STA, wherein the CVS frame further includes a field indicating a time interval of which the CVS frame is transmitted from the second STA and wherein the CVS frame is received on the every time interval of a CVS transmission.

In order to solve the aforementioned technical task, according to a further different embodiment of the present invention, a second station (STA) device configured to transmit a verification signal to a first station (STA) in a wireless communication system includes a processor configured to determine a white space map (WSM) for the first STA and a transceiver configured to transmit information on the white space map (WSM) to the first STA before the first STA operates in a white space band and configured to transmit a contact verification signal (CVS) including a map identifier (Map ID) of a currently valid WSM to the first STA, wherein a value of the Map ID field included in the CVS frame and a Map ID possessed by the first STA are compared with each other in the first STA, wherein the CVS frame further includes a field indicating a time interval of which the CVS frame is transmitted from the second STA, and wherein the CVS frame is received on the every time interval of a CVS transmission.

In the embodiments according to the present invention, following description can be commonly applied.

The field indicating the time interval can include a variable indicating a CVS transmission time interval.

If the CVS frame is not received on the every time interval, the method can further include the step of transmitting a channel availability query (CAQ) to the second STA.

In this case, if an updated WSM is not received, the method can further include the step of terminating a radio transmission.

If the Map ID is identical to each other according to the comparison result, the method can further include the step of judging that the WSM is valid.

If the Map ID is different from each other according to the comparison result, the method can further include the step of judging that the WSM is not valid.

In this case, if it is judged that the WSM is not valid, the method can further include the step of transmitting a CAQ request frame to the second STA.

In this case, the method can further include the step of receiving a CAQ response frame including an updated WSM from the second STA.

The second STA may correspond to an STA, which has provided the WSM to the first STA.

The Map ID field included in the CVS frame can indicate whether the WSM is modified.

The CVS frame can include the Map ID of the WSM for multiple locations.

A variable indicating a CVS enablement for the first and the second STA can be set to true.

The above-mentioned general description for the present invention and the following details of the present invention may be exemplary and are provided for the additional description for the inventions in the appended claims.

Advantageous Effects

According to the present invention, a method of efficiently constructing a CVS indicating the validity of an available channel for the unlicensed device in the white space band and a method of efficiently constructing a message to request and respond for information on the channel available to the unlicensed device can be provided.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 6 is an exemplary diagram of a geographical region represented by multiple locations and vicinity information;

FIG. 7 is a diagram for an example of a format of a Mode I CAQ (channel availability query) frame;

FIG. 9 is a diagram for an example of a Mode I CAQ frame format for a channel list available in one or more locations;

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

First of all, a general configuration of a wireless local area network is described with reference to FIG. 1 and FIG. 2.

Figure 1:
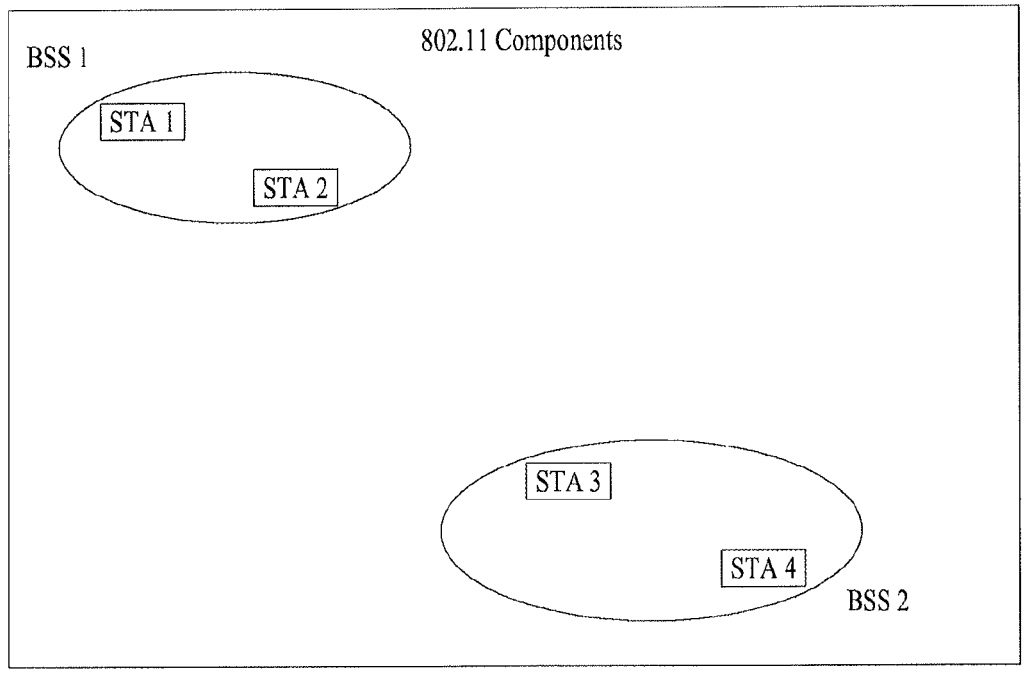
FIG. 1 is a diagram of one example of a configuration of a wireless local area network system.

FIG. 1 is a diagram of one example of a configuration of a wireless local area network system.

As depicted in FIG. 1, a wireless local area network includes at least one Basic Service Set (BSS). The BSS is a set of stations (STA) capable of communicating with each other by successfully performing synchronization.

The STA is a logical entity including a physical layer interface for a Medium Access Control (MAC) and wireless media. The STA includes an access point (AP) and a Non-AP STA (Non-AP station). A mobile terminal operated by a user corresponds to the Non-AP STA among the STAs. If it is simply called an STA, the STA may correspond to the Non-AP STA. The Non-AP STA can be called such a different name as a terminal, a Wireless Transmit/Receive Unit (WTRU), User Equipment (UE), a Mobile Station (MS), a Mobile Terminal, a Mobile Subscriber Unit, or the like.

And, the AP is an entity providing an STA associated to the AP with an access to a distribution system (DS) via the wireless media. The AP can be called a concentrated controller, a Base Station (BS), a Node-B, a Base Transceiver System (BTS), a site controller, or the like.

The BSS can be divided into an infrastructure BSS and an independent BSS (IBSS).

The BSS depicted in FIG. 1 corresponds to the IBSS. The IBSS means the BSS not including an AP. Since the IBSS does not include the AP, an access to the DS is not permitted to the IBSS. Thus, the IBSS forms a self-contained network.

Figure 2:
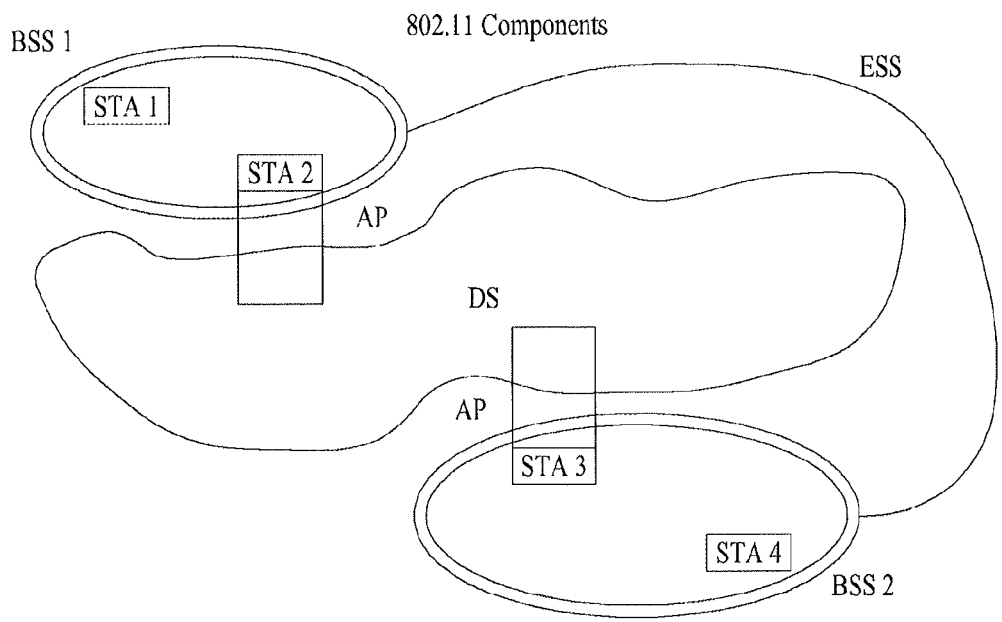
FIG. 2 is a diagram of a different example of a configuration of a wireless local area network system.

FIG. 2 is a diagram of a different example of a configuration of a wireless local area network system.

The BSS depicted in FIG. 2 corresponds to the infrastructure BSS. The infrastructure BSS includes at least one STA and an AP. Although a principle of a communication between non-AP STAs is to perform the communication via the AP, if a link is directly established between the non-AP STAs, it is possible to directly communicate between the non-AP STAs.

As depicted in FIG. 2, a plurality of infrastructure BSSs can be connected to each other via the DS. A plurality of the infrastructure BSSs connected through the DS is called an Extended Service Set (ESS). STAs included in the ESS can communicate with each other and a non-AP STA can move from one BSS to another BSS while seamlessly communicating in an identical ESS.

The DS is a mechanism connecting a plurality of APs to each other and the DS is not necessarily to be a network. If the DS is able to provide a prescribed distribution service, there is no limit on a form of the DS. For instance, the DS may correspond to such a wireless network as a mesh network or may correspond to a physical structure connecting APs to each other.

A spectrum not used by a licensed device is called a whitespace and the whitespace can be used by an unlicensed device. In order for an STA to operate in a whitespace spectrum, it is necessary to preferentially provide a protection scheme for the licensed device (incumbent user). In order for the STA or an AP to protect the licensed device, the STA or the AP should use a channel not used by the licensed device only. The channel capable of being used by the unlicensed device, since it is not used by the licensed device, is called an available channel. A most basic method for the STA or the AP to identify availability of a TV channel is a spectrum sensing and a method of finding out a TV channel schedule by accessing a database (DB). DB information includes the information on a schedule of a specific channel used by the licensed device in a specific location, and the like. Hence, in order to identify whether the TV channel is available, the STA or the AP should obtain the DB information based on location information of the STA or the AP in a manner of accessing the DB via the internet.

In order for an STA to access a network, the STA should find out a network eligible to participate. Before participating in a wireless network, the STA should identify a compatible network. A process of identifying a network existing in a specific area is called a scanning.

Figure 3:
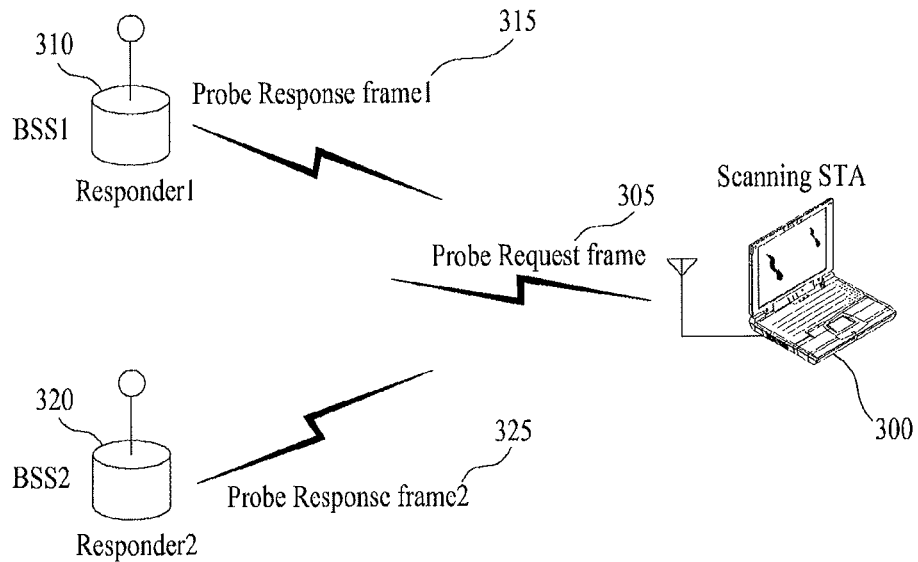
FIG. 3 is a schematic diagram of an active scanning.

FIG. 3 is a schematic diagram of an active scanning.

An STA performing a scanning in the active scanning moves around channels, transmits a probe request frame and waits for a response for the probe request frame to investigate which AP is existing in the vicinity of the STA. A responder transmits a probe response frame to the STA, which transmitted the probe request frame, in response to the probe request frame. In this case, the responder corresponds to an STA lastly transmitted a beacon frame in the BSS of a channel, which is currently scanned. In the infrastructure BSS, since an AP transmits a beacon frame, the AP corresponds to the responder. On the contrary, in the IBSS, since STAs in the IBSS transmit the beacon frame in turn, the responder is not constant.

Referring to FIG. 3, if a scanning STA 300 transmits a probe request frame 305, a responder 1 310 of a BSS1 and a responder 2 320 of a BSS2, which received the probe request frame, transmit a probe response frame 1 315 and a probe response frame 2 325 to the scanning STA 300, respectively. Having received the probe response frame, the scanning STA 300 stores BSS-related information included in the received probe response frame, moves to a next channel, and performs a scanning with an identical method in the next channel.

Figure 4:
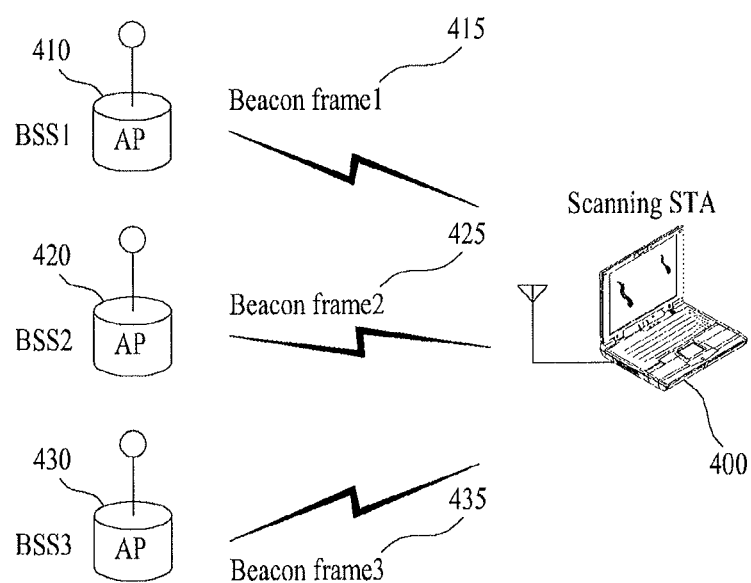
FIG. 4 is a schematic diagram of a passive scanning.

FIG. 4 is a schematic diagram of a passive scanning.

An STA performing a scanning in a passive scanning waits for a beacon frame by moving around channels. The beacon frame is one of management frames in IEEE 802.11. The beacon frame informs an existence of a wireless network and is periodically transmitted to enable the STA performing the scanning to participate in the wireless network by finding out the wireless network. In the infrastructure BBS, an AP plays a role of periodically transmitting the beacon frame.

Having received the beacon frame, the STA performing the scanning stores the information on the BSS included in the beacon frame, moves to a different channel, and records beacon frame information in each channel.

Referring to FIG. 4, a scanning STA 400 performing a channel scanning in a specific channel with a passive scanning scheme receives a beacon frame 1 415 transmitted by an AP1 410 of a BSS1 and a beacon frame 2 425 transmitted by an AP2 420 of a BSS2. If the scanning STA does not receive a beacon frame 3 435 transmitted by an AP3 430 of a BSS3, the scanning STA 400 stores information that 2 BSSs (BSS1 and BSS2) are detected in a measurement channel and moves to a different channel.

Compared the active scanning with the passive scanning, there exists a merit in that the active scanning has a less delay and less power consumption than the passive scanning.

In the following description, a process of enablement for an STA to operate in a whitespace band is explained.

The unlicensed device operating in the whitespace band can be classified into an enabling STA and a dependent STA. The enabling STA is an STA enabling the dependent STA, can transmit a signal without receiving an enabling signal, and can initiate a network.

The enabling STA provides a database (DB) with geolocation information and can obtain available channel information capable of being used in a corresponding geolocation from the DB. The enabling STA does not need to be a WLAN STA and may correspond to a logical entity capable of providing enabling-related services or may correspond to a network server.

The dependent STA is an STA capable of transmitting a signal in a manner of receiving an enabling signal only. The dependent STA is controlled by the enabling STA. The dependent STA should be enabled by the enabling STA and cannot be independently enabled.

Figure 5:
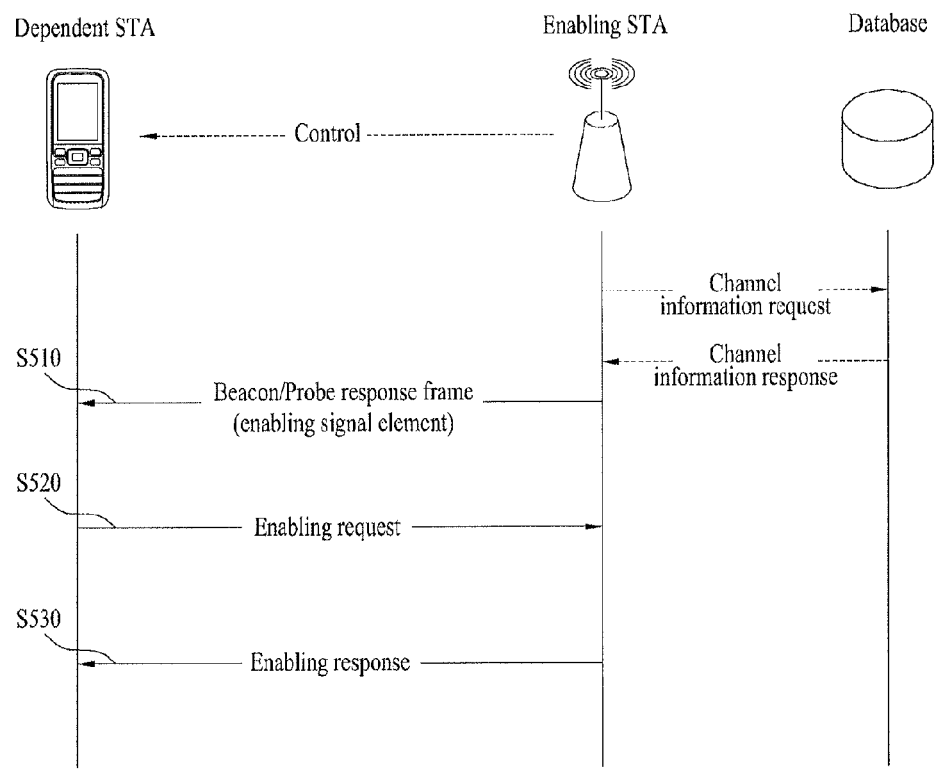
FIG. 5 is a diagram of an enabling process of an STA.

FIG. 5 is a diagram of an example of an enabling process of an STA.

IEEE 802.11y is a standard constructed for the unlicensed device operating on 3.5 GHz. The standard describes an enabling process and the enabling process is called a dynamic STA enablement (DSE). A process of enabling the dependent STA by the enabling STA may follow a process similar to the dynamic STA enablement of IEEE 802.11y. Although the enabling process practically applied to the whitespace may not be same with the process of the DSE, it is basically identical in a point that the dependent STA can transmit a signal to a corresponding band/channel only after receiving an enabling signal.

As depicted in FIG. 5, the enabling STA can transmit a beacon including an enabling signal or a probe response frame to the dependent STA [S510]. A signal indicating that an enabling is available is called an enabling signal. In an example of FIG. 5, the beacon including an enabling signal element or the probe response frame corresponds to the enabling signal. Having received and decoded the enabling signal, the dependent STA transmits an enablement request frame to the enabling STA using a channel received the corresponding signal [S520] and receives an enablement response frame from the enabling STA [S530].

Configuration of Available Channel Information

In order for not an incumbent user but the unlicensed device to operate in the whitespace band, the corresponding unlicensed device obtains information on a channel not interfering the incumbent user in a specific location, i.e., an available channel to protect the incumbent user and can operate according to the information. The information on the available channel may include an available channel list, which is a set of one or more available channels.

As mentioned in the foregoing description, the information on the available channel obtained by the enabling STA from the DB and/or the information on the available channel (or the available channel list) obtained by the dependent STA from the enabling STA can be provided in a form of a White Space Map (WSM). The available channel list (WSM) can be transmitted and received between the STAs according to the example depicted in FIG. 5 or can be provided via a Channel Availability Query (CAQ) request/response, which shall be described later, and the like.

In an available channel list obtaining mechanism of the STA in the WS, detail examples of the present invention for obtaining an available channel and a contact verification operation after the available channel is obtained are explained in the following description.

First of all, a process of obtaining an available channel list can be differently defined according to a type of the STA. The STA type currently defined includes 2 types. One is a device of a low power and the device capable of being carried by a person (personal/portable device (P/P STA)) and another one is a device of a high power and the device operating in a fixed position (fixed STA).

The fixed STA can transceives a signal in a specific position, which is fixed. In order for the fixed STA to transmit a signal in a corresponding position, the fixed STA should obtain available channel information in a manner of accessing a DB. In order to obtain the available channel information from the DB, a position of the fixed STA should be determined. To this end, such an equipment capable of checking a location as a GPS (global positioning system) may be installed in the fixed STA. Yet, the position of the fixed STA can be directly inputted by a person (professional installer). In case that the position of the fixed STA is directly inputted by the person, it is assumed that the position of the fixed STA does not change after the fixed STA is installed and the position of the fixed STA is inputted. If the position of the fixed STA changes (i.e., if the fixed STA is installed in a different position in a manner of being moved), a new position according to the change should be modified and registered. By doing so, location information of the fixed STA can be delivered to the DB and the fixed STA can obtain available channel information in a corresponding position from the DB.

The fixed STA may service a different fixed STA of the same kind or may service a P/P STA. When the fixed STA obtains the available channel information from the DB, the fixed STA should receive the available channel information of the fixed STA capable of being directly used by the fixed STA in a manner of delivering a device type of the fixed STA to the DB. Simultaneously, in order for the fixed STA to perform a service for the P/P STA, available channel information capable of being used by the P/P STA should be additionally received from the DB. Since a channel interval available to the fixed STA and the channel interval available to the P/P STA are different from each other and since maximum permissible transmit power and requirement for an adjacent channel for the fixed STA and the P/P STA are different from each other, an available channel list varies according to the type of each device. In particular, the fixed STA is permitted to transmit a signal on a frequency band of 512~608 MHz, 614~698 MHz, as well as 54~60 MHz, 76~88 MHz, 174~216 MHz, and 470~512 MHz. Yet, the P/P STA is not permitted to transmit a signal on a WS band of a different frequency band except the frequency band of 512~608 MHz and 614~698 MHz. And, the fixed STA can transmit a signal with a high power compared to the P/P STA. The maximum permissible transmit power of the fixed STA is 4 Watt (EIRP (Effective Isotropically Radiated Power)). On the other hand, the maximum permissible transmit power of the P/P STA is 100 mW (EIRP).

The P/P STA corresponds to the equipment capable of transceiving a signal in an unspecified position. A position of the P/P STA can change. In many cases, since the P/P STA is a portable device, it is difficult to predict the mobility of the P/P STA. The P/P STA can be divided into 2 types (Mode I STA and Mode II STA) according to whether the P/P STA has identification capability for the position of the P/P STA. The identification capability for a position means a geo-location determination capability and an access capability to the DB via an internet access.

The Mode II STA has a capability of the geo-location determination and internet access. After the information on an available channel in the position of the Mode II STA is obtained by directly accessing the DB, the Mode II STA can operate in the WS at a corresponding position. And, after the available channel information is obtained from the DB, the Mode II STA can transmit a signal indicating the Mode I STA to start a communication. Yet, the Mode I STA is not required to have a capability of checking a position of the Mode I STA or a capability of accessing the DB. Yet, the Mode I STA obtains the available channel information in a manner of being controlled by a different STA (the Mode II STA capable of accessing the DB and having valid channel information or a fixed STA) and can perform an operation in the WS.

Mode II Channel Availability Query (CAQ)

The Mode II STA registers location information of the Mode II STA by accessing the DB and should be able to obtain available WS channel list. A process of obtaining the available channel list obtained by the Mode II STA is called a Mode II channel availability query (Mode II CAQ) process.

After the Mode II STA has obtained the available channel information in a specific position via the CAQ process, if the position of the Mode II STA changes more than a prescribed distance (e.g., more than 100 meters) or previously obtained DB information is not valid anymore, the Mode II STA performs the CAQ process again.

Basically, the Mode II CAQ is the process of obtaining available channel information in a specific position. Hence, if location information changes as the Mode II STA moves more than a prescribed distance (e.g., more than 100 meters), an overhead, which is resulted from obtaining an available channel in a new position by mandatorily accessing the DB again, occurs. In order to reduce the overhead, it is able to apply a scheme of obtaining a channel available for the Mode II STA in multiple locations from the DB in advance. This sort of scheme can be very usefully utilized in case that the Mode II STA can predict a moving path or a moving area of the Mode II STA.

Specifically, the Mode II STA can perform the Mode II CAQ for one or more locations. Location information on one location among the one or more locations can be configured by a combination of the information (information on a latitude, information on a longitude, information on an altitude) specifying the one location and vicinity information. The vicinity information, for instance, can include radius information, which is based on the one location. As mentioned in the foregoing description, a combination of the location information on each of the one or more locations and the vicinity information can be determined and the location information on one or more locations can be configured by a set of the combinations.

FIG. 6 is an exemplary diagram of a geographical region represented by multiple locations and vicinity information.

Referring to an example of FIG. 6 (a), 3 different locations are determined on an anticipated moving path of the Mode II STA and a radius on each of the 3 locations is determined by a size of which the anticipated moving path is not straying from a union of the regions including each of the radiuses of the 3 locations. 3 points (P1, P2, and P3) are specified in the example of FIG. 6 (a) and the P1, the P2, and the P3 can be specified by a combination of latitude, longitude, and altitude (for instance, it can be represented as P1=(LAT1, LONG1, ALT1), P2=(LAT2, LONG2, ALT2), P3=(LAT3, LONG3, ALT3)). And, the vicinity information on the P1, the P2, and the P3 can be configured by each of the radius informations (R1, R2, and R3). Hence, the location information on the 3 locations can be configured by (P1, R1), (P2, R2), (P3, R3). The Mode II STA can perform the channel availability query to the DB using the aforementioned location information.

Referring to an example of FIG. 6 (b), one location is determined on the anticipated moving path of the Mode II STA and 3 different radiuses capable of including the anticipated moving path can be determined from the one location. One location P1 on the anticipated moving path is specified in the example of FIG. 6 (b) and 3 different radiuses R1, R2, and R3 can be determined on the basis of the P1 as a center point. By doing so, the location information can be configured by (P1, R1), (P2, R2), (P3, R3). The Mode II STA can perform the channel availability query to the DB using the aforementioned location information.

The DB can calculate an available channel list for a region indicated by the location information (e.g., a combination of location and vicinity information) of which the Mode II STA has queried. If the Mode II STA queries multiple locations (e.g., multiple combinations of location and vicinity information), the DB calculates multiple available channel lists in a manner of combining the available channel list corresponding to each of the locations and may be then able to respond to the query of the Mode II STA for the multiple available channel lists.

By performing the Mode II CAQ process, the Mode II STA can obtain multiple channel informations available on the anticipated moving path in advance.

Mode I CAQ

Since the Mode I STA has no database access capability or geo-location determination capability, the Mode I STA cannot independently operate in a WS. The Mode I STA can perform a communication in the WS at last only when the Mode I STA receives a special signal (e.g., an enabling signal) from a different STA (e.g., a Mode II STA). It is necessary for the Mode I STA to obtain available channel information from the Mode II STA before the Mode I STA transmits a data. As mentioned in the foregoing description, a process of obtaining the available channel information obtained by the Mode I STA via the Mode II STA is called a Mode I channel availability query (CAQ) process.

FIG. 7 is a diagram for an example of a format of a Mode I CAQ (channel availability query) frame.

A Category field may have a value indicating a category (spectrum management, QoS (quality of service), a block ACK, a public action, and the like) to which a frame format is applied. In an example of a CAQ frame format, the Category field may have a value of a code (e.g., 4) indicating the public action.

A Public Action field may have a value indicating operations related to an intra-BSS communication, an inter-BSS communication, an unassociated-STA communication with an AP. In the example of the CAQ frame format, the Public Action field may have a value indicating a channel availability query.

Subsequently, if a Reason Result Code field value corresponds to 1, it means that the Mode I CAQ is requested (in particular, a channel availability list is requested) and if the Reason Result Code field value corresponds to 3, it means that a result of the available channel list is successful. If the Reason Result Code field value corresponds to 1, following fields (i.e., Map ID, Channel number, Maximum power level, and validity) of a Length field can be omitted. If the Reason Result Code field value is 3, it corresponds to a response for a request of the available channel list and includes a result of the available channel list.

The Length field may have a value indicating a length of the rest of frame fields and a unit of the Length field is octet (i.e., 8-bit unit). The following fields of the Length field may be omitted. Since the Channel number field, the Maximum power level field, and the validity field can be repeated, the value of the Length field is variable.

The Channel number field, the Maximum power level field, and the validity field mean available channel number, permitted maximum output power, and available validity time, respectively. In case of transmitting an available channel list consisted of one or more numbers (N (N≥1)) of channels, the Channel number field, the Maximum power level field, and the validity field can be repeated as many as the number (N) of available channels and a corresponding channel list may have a Map ID which is a unique number. In this case, repeating a field N times means that the field exists N times. For instance, repeating a field once means that the field exists one time only. If even a single available channel exists, a Map ID is provided for the corresponding available channel. In particular, the Map ID is provided for one available channel list (one available channel list consists of N numbers of available channel(s)). And, if an available channel list is updated, the Map ID increases by 1. If a channel list is updated after a maximum value (e.g., $2^8-1$) of the Map ID is provided, the Map ID may correspond to 0 and a next updated channel list can be provided with the Map ID increasing by 1.

Contact Verification Signal (CVS)

The Mode I STA should consistently check whether the Mode I STA exists within the coverage of the Mode II STA and whether an available channel obtained via the Mode I CAQ is valid even after an available channel list is obtained via the Mode I CAQ. This process is called contact verification and a signal transmitted to the Mode I STA by the Mode II STA for the contact verification is called a contact verification signal (CVS). In particular, the CVS is transmitted by an enabling STA (e.g., the Mode II STA) and the CVS is a signal transmitted to check whether dependent STAs (e.g., the Mode I STA) still exist in a reception range of the enabling STA and whether an available channel list is valid. And, the dependent STA should receive the CVS signal from the exact enabling STA, which has provided the available channel list (or WSM).

In order to configure the CVS including the aforementioned function, first of all, it is necessary to define a frame format for the CVS. The CVS can be defined as an information element (IE) in management frame body components. In general, the information element can include an Element ID field of one octet length, a Length field of one octet length, and a specific information field of variable length. For instance, a CVS IE format can be defined in a manner of including such contents as a following Table 1 in an element ID table of IEEE 802.11 standard.

TABLE 1

| Information element | Element ID | Length (in octets) | Extensible |
|---|---|---|---|
| Contact Verification Signal (see 8.4.2.af4) | <ANA> | variable | Yes |

Referring to Table 1, a unique element ID distinguished from a different element ID is provided for the CVS IE and the length of the CVS IE is variable and extensible.

And, the CVS can be defined as an STA capability for an STA to support transmission and reception of the CVS. To this end, an extended capabilities element can be defined and a bit indicating the content related to the CVS can be defined in a capabilities field of the extended capabilities element. For instance, CVS capability can be defined in a manner of including such contents as a following Table 2 in a capability field table of IEEE 802.11 standard.

TABLE 2

| Bit | Information | Notes |
|---|---|---|
| <ANA> | Contact Verification Signal | The STA sets the Contact Verification Signal field to 1 when the MIB attribute dot11ContactVerificationSignalActivated is true, and set it to 0 otherwise. See 10.af2.3. |

Referring to Table 2, contents related to the CVS can be indicated in a prescribed bit position of the capability field. For instance, among the Management Information Base (MIB) attributes, if a dot11ContactVerificationSignalActivated, which indicates CVS enabling, is true, the STA sets a prescribed bit value of the CVS field to 1, and otherwise, sets to 0.

Figure 8:
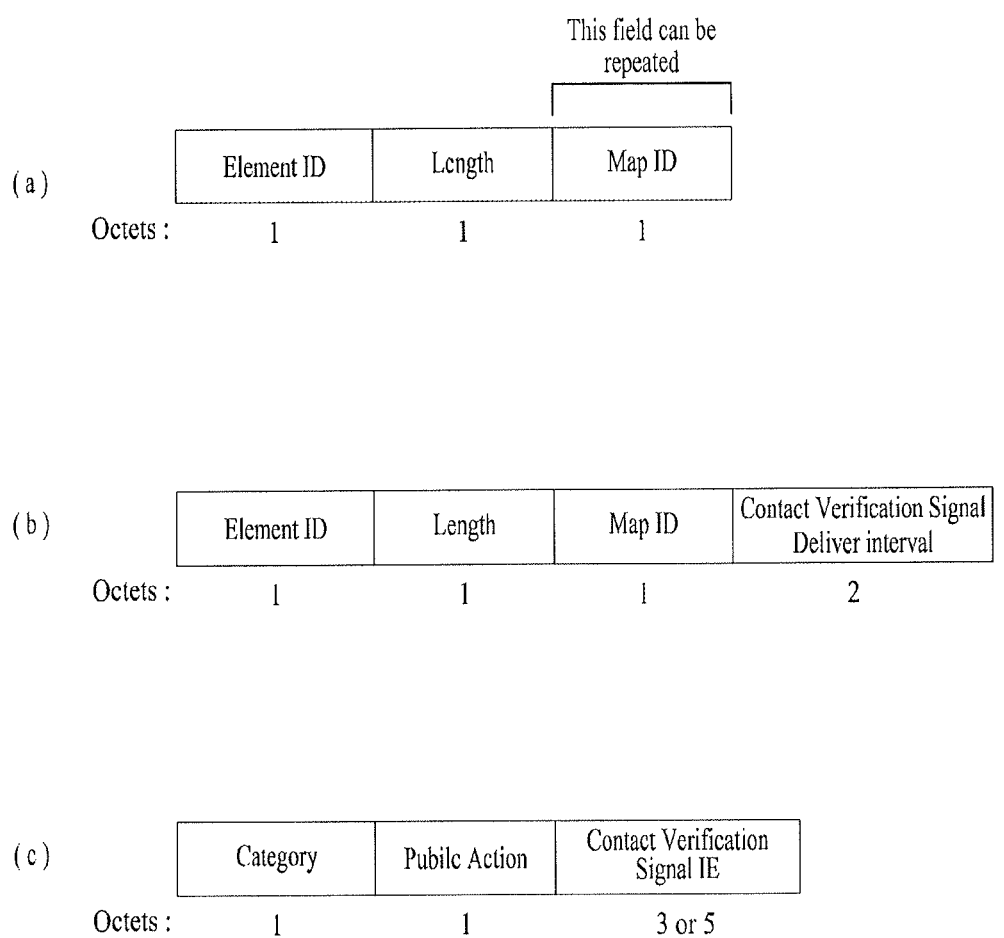
FIG. 8 is a diagram of a format related to a CVS (contact verification signal)

FIG. 8 is a diagram of a format related to a CVS information element (IE).

FIG. 8 (a) is a diagram of an example of a CVS IE format. Referring to the example of FIG. 8 (a), an Element ID field is a field of one octet length and may have a value (e.g., a unique ID explained in relation to FIG. 1) indicating that a corresponding IE is a CVS IE. A Length field is a field of one octet length and may have a value indicating the length of the fields following the Length field. In the example of FIG. 8 (a), the value of the Length field can be set to 1. A Map ID field can be set to a number identifying a currently valid WSM (or an available channel list). Having received this kind of CVS IE, the dependent STA (or the Mode I STA) can judge whether the WSM used by the dependent STA is valid in a manner of comparing the Map ID of the WSM currently used by the dependent STA with the Map ID included in the CVS.

FIG. 8 (b) is a diagram of a different example of the CVS IE format. Referring to the example of FIG. 8 (b), the Element ID field, the Length field, and the Map ID field include content identical to the content described in the example of FIG. 8 (a). In the example of FIG. 8 (b), a Contact Verification Signal Delivery Interval field can be defined as a field of 2 octets length and can be set to a value indicating the time taken for transmitting a next CVS element by an enabling STA (e.g., the Mode II STA). For instance, after the present CVS is transmitted, if the next CVS is to be transmitted after N times of a DTIM (Delivery Traffic Indication Message Interval), a value of the CVS delivery interval field can be set to N.

FIG. 8 (c) is a diagram of an example of an action frame format related to the CVS. An action frame delivering a CVS IE can be defined as a public action frame. The public action frame is defined to additionally permit an inter-BSS communication and an unassociated-STA communication for an AP in an intra-BSS communication. Since the public action frame is distinguished according to a value of a public action field, the value of the public action field should be defined to define the public action frame for the CVS. For instance, a CVS-related action frame can be defined in a manner of including such contents as a following Table 3 in a Table indicating the value of the public action field of IEEE 802.11 standard.

TABLE 3

| Action field value | Description |
|---|---|
| <ANA> | Contact Verification Signal |

In the Table 3, by defining the value of the public action field as a unique value for a CVS, it is able to distinguish the public action frame from a public action frame of a different purpose.

As mentioned in the foregoing description, the CVS frame defined as the public action frame is transmitted by an enabling STA and can be used to inform whether the available channel information from the DB is updated.

In the example of FIG. 8 (c), the Category field can be set to a value indicating a public action and the Public action field can indicate that the public action frame corresponds to the CVS frame in a manner of being set to a value identical to the value defined in the Table 3. Subsequently, the CVS IE field of FIG. 8 (c) can be configured by the content described in the CVS IE of FIG. 8 (a) or FIG. 8 (b). In particular, in case of such a format as the CVS IE format in FIG. 8 (a), a length of the CVS IE field of FIG. 8 (c) becomes 3 octets. In case of such a format as the CVS IE format in FIG. 8 (b), the length of the CVS IE field of FIG. 8 (c) becomes 5 octets.

Subsequently, a protected dual public action frame can be defined among the action frame formats. The protected dual public action frame is defined for specific information to be robustly communicated between STAs. The specific information is identical to the information delivered from an action frame, which is not robust. Since the protected dual public action frame is distinguished according to a value of the public action field defined for the protected dual public action frame, the value of the public action field should be defined to define the protected dual public action frame for a CVS. For instance, a protected public action frame for the CVS can be defined in a manner of including such contents as a following Table 4 in a Table indicating the value of the public action field defined for the protected dual public action frame of IEEE 802.11 standard.

TABLE 4

| Action field value | Description |
|---|---|
| <ANA> | Protected Contact Verification Signal |

In the Table 4, by defining the value of the public action field by a unique value for a protected CVS, it is able to distinguish the protected dual public action frame from a protected dual public action frame of a different purpose. In this case, the protected CVS frame format can be identical to the CVS frame format of FIG. 8 (c). The protected CVS frame format can be used instead of the CVS frame in case that a management frame protection is negotiated.

In case that a CVS is defined as mentioned in the foregoing description, CVS-related content for an operation of a Mac sublayer management entity (MLME) in a regulatory domain (e.g., a licensed band) can be defined as follows.

A CVS frame can be transmitted by an enabling STA to check whether dependent STAs still exist in a reception range of the enabling STA and to verify whether an available channel list is valid. An STA supporting a CVS can advertise that the STA supporting the CVS has CVS-related capability in a manner of including the extended capability element (refer to the Table 2) in a beacon, an association request, a re-association request, an association response, a probe response frame, and the like.

An enabling STA of which the dot11ContactVerificationSignalActivated is set to true can transmit the protected dual CVS action frame (refer to Table 4) to the dependent STAs of which the dot11ContactVerificationSignalActivated is set to true. In this case, the dependent STAs are the STAs to which the enabling STA has provided WSMs.

After receiving the WSMs, the dependent STA can receive a CVS from the enabling STA, which has provided the WSMs to the dependent STA, to check whether the dependent STA exists in the reception range of the enabling STA. The CVS includes a Map ID field indicating whether the WSM is modified (refer to FIG. 8 (a) or FIG. 8 (b)). The dependent STA can compare the Map ID of the WSM of the dependent STA with the Map ID field of the CVS. If the Map IDs are identical to each other, the dependent STA can assume that the WSM is still valid. If the MAP IDs are different from each other, the dependent STA can recognize that the WSM of the dependent STA is not valid and it is necessary to transmit a CAQ.

The dependent STA can receive the CVS once on every dot11ContactVerificationSignalInterval. If the dependent STA fails to receive the CVS, the dependent STA can transmit the CAQ to the enabling STA. If an updated WSM is not obtained, the dependent STA can stop transmitting over the air.

In addition, a TVWS function, which corresponds to an example of a white space, can be defined as Table 5 to synchronize in implementing a protocol.

TABLE 5

| Item | Protocol Capability | References | Status | Support |
|---|---|---|---|---|
| *WS1 | Fixed STA TVWS Operation | 10.12.3, Annex D, Annex E.2.4 | CFaf:O | Yes, No. N/A |
| *WS2 | Master STA TVWS Operation | 10.12.3, 10.12.4, Annex D, Annex E.2.4 | CFaf:O | Yes, No. N/A |
| *WS3 | Client STA TVWS Operation | 10.12.5, Annex D, Annex E.2.4 | CFaf:O | Yes, No. N/A |
| WS3.1 | Dependent STA TVWS Behavior | 10.12.5, Annex D, Annex E.2.4 | WS3:M | Yes, No. N/A |
| WS4 | White Space Map Announcement | 8.4.2.af1, 8.5.8.af1, 10.af2.2 | CFaf:-M | Yes, No. N/A |
| WS5 | Multi-band Operation | 8.4.2.af2, 10.af2.3 | CFaf:O | Yes, No. N/A |
| WS6 | Channel Power Management Announcement | 8.4.2.af1, 8.5.8.af2, 10.af1, Annex E.2.4 | CFaf:M | Yes, No. N/A |
| WS9 | Contact Verification Signal | 8.4.2.af5, 8.4.5.3. 8.5.8.af4, 10.af2.2 | CFaf:M | Yes, No. N/A |

In particular, as shown in Table 5, in order to implement a protocol for a TVWS operation, CVS-related functions can be additionally defined. Related contents can be defined according to the contents described in the aforementioned Table 1 to Table 4, FIG. 8, and the like.

A frequency band capable of being used in a wireless local area network system can be differently defined according to a country. To this end, country elements and operating classes can be defined. The operating classes can be defined by a set of channels capable of being used by a country. Regarding this, band-specific operating requirements can be defined. For instance, in order to support a CVS operation on a VWS band (54 MHz to 698 MHz) in the United States of America, an STA can set the dot11ContactVerificationSignalActivated of the MIB elements indicating a CVS enablement to true as depicted in table 6.

TABLE 6

STAs shall have the following elements set to "true"
— dot11LCIDSERequired,
— dot11OperatingClassesRequired,
— dot11SpectrumManagementRequired,
— dot11MultiDomainCapabilityActivated,
— dot11ChannelPowerManagementActivated—,
— dot11ContactVerificationSignalActivated.

And, in case of encoding MAC and PHY MIB, it is able to add a new MIB variable indicating the CVS enablement, which is a dot11ContactVerificationSignalActivated as shown in Table 7.

TABLE 7

Dot11StationConfigEntry::=
SEQUENCE {
dot11TVWSMapEnabled TruthValue, (472r1)
dot11TVWSMultiBandOperationEnabled TruthValue, (472r1)
dot11TVWSMapPeriod Unsigned32, (472r1)

TABLE 7-continued dot11TVWSMapValidTime Integer, (472r1)
dot11RLSImplemented TruthValue, (737r3)
dot11RLSActivated TruthValue, (737r3)
dot11WhiteSpaceMapEnabled TruthValue, (790r2)
dot11ContactVerificationSignalActivated TruthValue,
dot11WhiteSpaceMapPeriod Unsigned32, (790r2)
dot11WhiteSpaceMapValidTime Integer, (790r2)
dot11ChannelPowerManagementActivated TruthValue (767r1)
}

And, in case of encoding the MAC and the PHY MIB, it is able to add a definition for the dot11ContactVerificationSignalActivated indicating the CVS enablement as depicted in Table 8.

TABLE 8 dot11ContactVerificationSignalActivated OBJECT-TYPE
SYNTAX TruthValue
MAX-ACCESS read-write
STATUS current
DESCRIPTION
"This is a control variable.
It is written by an external management entity.
Changes take effect for the next MLME-START.request primitive.
This attribute, when true, indicates that the system capability for Contact Verification Signal is enabled. False indicates that the station has no Contact Verification Signal so that the capability is present but is disabled."
DEFVAL { FALSE }
::= { dot11StationConfigEntry <ANA> }

And, in case of encoding the MAC and the PHY MIB, it is able to newly add a definition for a dot11ContactVerificationInterval (or dot11WSMNotificationPeriod) related to a CVS transmission interval as shown in Table 9.

TABLE 9 dot11ContactVerificationInterval OBJECT-TYPE
SYNTAX Unsigned32(1..255)
MAX-ACCESS read-write
STATUS current
DESCRIPTION
"This is a control variable.
It is written by an external management entity.
Changes take effect for the next MLME-START.request primitive.
This attribute specifies the number of beacon internals
."
DEFVAL { 60 }
::= { dot11StationConfigEntry <ANA> }

As mentioned in the foregoing description, after the dependent STA (e.g., the Mode I STA) received an available channel list (or WSM) from the enabling STA (e.g., the Mode II STA), the dependent STA (e.g., the Mode I STA) can consistently receive a CVS from the enabling STA (e.g., the Mode II STA) with a period less than a preset time interval (e.g., CVSTimeInterval). For instance, the CVSTimeInterval value can be set to 60 seconds. The Mode I STA should receive the CVS on every 60 seconds or with a period less than 60 seconds. The Mode I STA can judge that a corresponding channel list is continuously valid in a manner of consistently receiving the CVS, which corresponds to the Map ID of the currently possessed available channel list, with the set period. If the Mode I STA does not receive the CVS corresponding to the Map ID of the currently possessed available channel list for the CVS- TimeInterval, the Mode I STA judges that the channel list corresponding to the Map ID is not valid anymore. In particular, the CVSTimeInterval can be represented as an expiration date of the available channel list. If the Mode I STA does not possess a valid available channel list, the Mode I STA should obtain an available channel list in a manner of performing the Mode I CAQ process again.

A case of not capable of receiving the CVS, which corresponds to the Map ID of the currently possessed available channel list, for the CVSTimeInterval by the Mode I STA may include a case of not capable of receiving the CVS itself (e.g., a case of getting out from the coverage of the Mode II STA by the Mode I STA) and a case that the Map ID of the CVS is not matched with the Map ID of the currently possessed available channel list although the CVS is received. In this case, the Mode I STA judges that the currently possessed available channel list is not valid anymore. The Mode I STA should obtain new available channel information corresponding to the Map ID included in the CVS in a manner of transmitting the Mode I CAQ again and receiving a Mode I CAQ response.

In case that the Mode II STA moves, the CVS and the Mode I CAQ can be used to inform the Mode I STA of an updated available channel list.

For instance, assume that the Map ID of the available channel list provided to the Mode I STA is k. Subsequently, if the Mode II STA moves more than a prescribed distance and if the location of the Mode II STA is modified, the Mode II STA can obtain an available channel list in a modified location again by accessing the DB. If the channel list newly obtained from the DB by the Mode II STA is different from the channel list of which the Mode II STA conventionally possessed, the Map ID of the newly obtained channel list can be set to k+1. By doing so, the Mode II STA can transmit the CVS to the Mode I STA in a manner of setting the Map ID value included in the CVS to k+1. Having received the CVS, the Mode I STA checks that k+1, which is the Map ID different from k of the Map ID of the available channel list possessed by the Mode I STA, is included in the CVS and can recognize that the available channel list is updated. Hence, the Mode I STA can transmit a Mode I CAQ request to the Mode II STA. The Mode II STA can transmit a Mode I CAQ response to the Mode I STA in response to the Mode I CAQ request. Values of a Map ID field, a Channel number field, a Maximum power level field, and a validity field included in the Mode I CAQ response are newly set to the value corresponding to a new available channel list.

Meanwhile, the Mode II STA can obtain a channel available for one or more locations from the DB via the Mode II CAQ. By doing so, if the location of the Mode II STA were modified in the future, the Mode II STA does not access the DB since the Mode II STA already obtained the channel list capable of being used in the modified location. Yet, a case that the Mode II STA does not access the DB in the modified location may correspond to a case that channel validity of a corresponding channel list is not expired for travel time or a case that an update does not occur in the DB for the travel time. If the channel validity is expired, the Mode II STA can access the DB to obtain new available channel information in the modified location. If DB update occurred, the DB can inform the Mode II STA of the change of the available channel information (for instance, the DB can inform the Mode II STA in a form of an announcement).

As mentioned earlier, in case that the Mode II STA has obtained the channel list available for one or more locations in advance, if the information of the available channel among the available channel list obtained in advance is modified due to a location change or the DB update, the modified available channel information should be reported to the Mod I STA. It's because the Mod I STA possesses the available channel list at the time of receiving a response for a Mode I CAQ request only. And, in terms of the Mode I STA, although whether the available channel list possessed by the Mode II STA is modified or not can be checked via whether the Map ID of the CVS is modified, since the CVS does not include the channel information, the Mode I STA should make a request for the modified channel list information to the Mode II STA again. Hence, having received the CVS of the modified Map ID, the Mode I STA can transmit the Mode I CAQ request to the Mode II STA.

Mode I CAQ for One or More Locations

The Mode II STA can inform the Mode I STA of a channel list capable of being used in one or more locations (in particular, multiple locations) at a time. A scheme for informing an available channel list to the Mode I STA by the Mode II STA includes a scheme of responding a CAQ in response to a CAQ request of the Mode I STA or a scheme of responding an unsolicited CAQ. The unsolicited CAQ response means a message of which the Mode II STA informs available channel information without the CAQ request of the Mode I STA.

FIG. 9 is a diagram for an example of a Mode I CAQ frame format used for delivering a channel list available in one or more locations. The Mode I CAQ frame format of FIG. 9 can be defined as a new frame format to which a Number of Locations field in the Mode I CAQ frame format of FIG. 7 is added and fields (the Map ID field, the Channel number field, the Maximum power level field, and the Validity field) corresponding to the channel list are repeated.

For clarity, explanation on the fields (Category, Public Action, and Reason Result Code) duplicated with FIG. 7 is omitted in the example of the Mode I CAQ frame format.

Number of locations field may have a value indicating the number (i.e., K (K≥1)) of locations to which the Mode II STA queries the DB. Since one available channel list is given to one location, the value (i.e., K) of the Number of locations field has a value identical to the number (the number of repeating of {one 'Map ID' and N number of 'Channel number, Maximum power level, and Validity' field}) of available channel list in the field following the Number of locations field.

The Length field may have a value indicating the length of the fields following the Length field. In the Mode I CAQ frame format in FIG. 9, the Length field has a value of K*(N*3+1). Yet, the example shown in FIG. 9 is just an exemplary to explain the principle of the present invention. A form of a channel list repeating in a frame format, which is repeated to represent the channel list (or WSM) for multiple locations, can be variously defined.

For instance, in case of K=1 in the example of FIG. 9, the Length field can be represented as the Length field includes information indicating the length (i.e., the length of the Map ID+the length of the Channel number field, the Maximum power level field, and the Validity field) of the channel list. For instance, if it is assumed that one channel list includes N number of channels, since the Channel number field, the Maximum power level field, and the Validity field are repeated N times (N*(1+1+1) and the length of the Map ID is 1, the Length field may have a value of N*3+1. In this case, a maximum value of the N is limited to the maximum value capable of being represented by the Map ID. In particular, in the example of FIG. 9, the Mode I CAQ frame format in case of K=1 has a configuration practically identical to the aforementioned configuration of the Mode I CAQ frame format in FIG. 7.

More extensively, in case of K>1 (i.e., K≥2), {one 'Map ID' and N number of 'Channel number field, Maximum power level, and Validity field'} can be repeated K times after the Length field. Since the length of the Map ID field, the Channel number field, the Maximum power level field, and the Validity field is one octet, respectively, the Length field may have a value of K*(N*3+1).

The Map ID field is a unique number of each channel list. And, a value different from each other is given to a channel list different from each other. In particular, since one available channel list is provided in one location, a Map ID of a channel list in one location and the Map ID of the channel list in another location are provided with a value different from each other. And, in case that an available channel list is updated, the Map ID can be provided with a value different from the value of the Map ID previously used. For instance, the Map ID can be set to increase by 1 on every update of the available channel list. Yet, this is just an exemplary and may be non-limited to this. According to the example that the Map ID increases by 1 on every update of the available channel list, in case that a channel list is updated after a maximum value (e.g., $2^8-1$) of the Map ID is provided to the channel list, 1 is provided to a value of the Map ID for an updated channel list and the Map ID value increasing by 1 is provided to a channel list to be updated. In particular, the value of the Map ID field explained in FIG. 7, which is the example of the Mode I CAQ frame format for an available channel list in one location, is a scheme for providing 0 after a maximum value (e.g., $2^8-1$). On the other hand, the value of the Map ID field explained in FIG. 9, which is the example of the Mode I CAQ frame format for an available channel list in one or more locations, is a scheme for providing 1 after a maximum value (e.g., $2^8-1$) of the Map ID field. In the example of FIG. 9, the Map ID field having a value of 0 can be set to be used to indicate whether a channel list is updated and may not be used as an identification number of the channel list.

As shown in the example of FIG. 9, the Mode I CAQ for multiple locations can be used by a request of the Mode I STA or can be used by a decision of the Mode II STA, which knows a moving area of the Mode II STA and is capable of directly selecting an operation channel. In case of the former, the Mode I STA can transmit a Mode I CAQ request message to the Mode II STA before an operation is started and the Mode II STA can transmit a Mode I CAQ response message such as the example of FIG. 9 to the Mode I STA in response to the Mode I CAQ request message. In case of the latter, after obtaining an available channel list for multiple locations from the DB on a random timing point, the Mode II STA can transmit (transmit in a form of an unsolicited CAQ response or an announcement) the Mode I CAQ response message to the Mode I STA. The latter case can be generally used more than the former case, by which the present invention may be non-limited.

After obtaining available channel list for multiple locations from the DB and providing a Map ID different from each other to a channel list corresponding to each location, the Mode II STA can inform the Mode I STA of the corresponding channel lists at a time via the Mode I CAQ message such as the example of FIG. 9. The Map ID of which the Mode II STA informs the Mode I STA can be identical to the identification number numbered by the DB according to an available channel list when the DB transmits the available channel list to the Mode II STA. Or, besides the identification number numbered by the DB, the Mode II STA can generate, provide, and manage a Map ID according to each available channel list. For instance, in case that the Mode II STA provides the Map ID to a plurality of available channel lists for multiple locations at a time, the Map ID can be sequentially numbered. This is because the Mode II STA intends to easily manage the Map ID in case the available channel list is updated by the DB. And, if the available channel list is updated in a state that the Map ID is all assigned up to the maximum value (e.g., $2^8-1$), a value of the Map ID field is sequentially assigned not from 0 but from 1. In this case, in order to prevent the channel list assigned as Map ID=1 from being handled as a channel list identical to the channel list of previously assigned as Map ID=1, the Mode II STA transmits a CVS configured by Map ID=0 to the Mode I STA. Hence, although the Map ID of the Mode I CAQ transmitted thereafter has a value identical to the previous Map ID, the Mode II STA can inform that it is a different channel list indicator. And, Map ID=0 can be used as a usage for indicating that a correlation between the channel list and the map ID is newly defined instead of being assigned to the available channel list. In particular, in case of reusing a conventional Map ID value in a manner of assigning the Map ID from 1 again since the Map ID is over the maximum value, the Mode II STA can transmit the CVS configured by Map ID=0 to inform the Mode I STA of a channel list modification.

And, for instance, multiple locations included in a CAQ request frame can be sequentially mapped to a plurality of available channel lists (WSM) included in a CAQ response frame. In particular, if the multiple locations included in the CAQ request are sequentially called a first location, a second location, . . . , a K location, the CAQ response can sequentially include an available channel list for the first location, an available channel list for the second location, . . . , an available channel list for the K location. Similar to this, an order of the Map ID included in a CVS frame can be mapped to the order (or the order of a plurality of available channel lists in the CAQ response frame) of the location information in the CAQ request frame as well.

Figure 10:
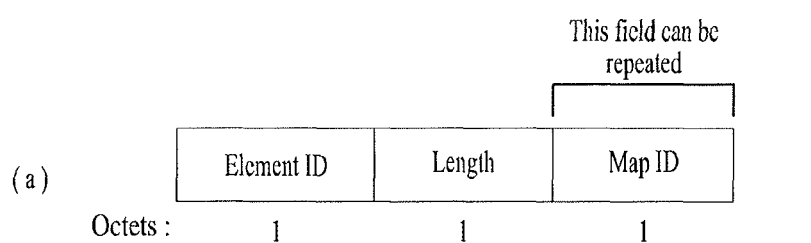
FIG. 10 is a diagram of a CVS information element format for one or more available channel lists.
Figure 10:
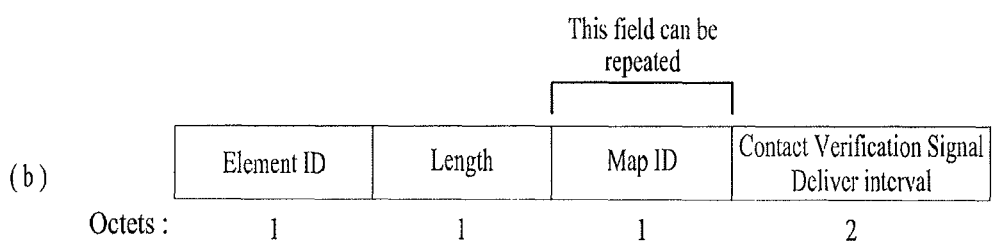

FIG. 10 is a diagram of a CVS information element (IE) format for one or more available channel lists. A CVS format in FIG. 10 (a) is different from the CVS format in FIG. 8 (a) in that the Map ID field can be repeated. Since the rest of the fields are identical to the fields of the example of FIG. 8, duplicated explanation is omitted. In the CVS format in FIG. 10 (a), it is not excluded a case that one Map ID field is included only. And, a CVS IE format in FIG. 10 (b) is an example of which a CVS delivery interval field is added to the CVS format in FIG. 10 (a).

The Mode II STA can provide the Map ID of one or more channel lists to the Mode I STA using the CVS format in FIG. 10. The Mode I STA can judge that a corresponding channel list is continuously valid in a manner of consistently receiving a CVS, which corresponds to the Map ID of a currently possessed available channel list, with a period less than a preset time interval (e.g., CVSTimeInterval). And, in case that although the Mode I STA receives the CVS itself for the CVSTimeInterval but cannot receive a Map ID of a specific channel list in the received CVS for the CVSTimeInterval (e.g., 60 seconds), the Mode I STA can judge that the corresponding channel list is not valid anymore. If the Mode I STA cannot receive the CVS itself for the CVSTimeInterval, the information on the channel lists obtained via the Mode I CAQ becomes not valid anymore. In this case, the Mode I STA can perform the Mode I CAQ process again.

In particular, the CVSTimeInterval can be represented as an expiration date of the available channel list. Hence, in order to maintain one or more channel lists valid for the time more than the CVSTimeInterval, one or more Map IDs for one or more channel lists should be delivered to the Mode I STA in a manner of being included in the CVS. To this end, the CVS of the format depicted in FIG. 10 can be used.

Having received the CVS, the Mode I STA checks the Map IDs included in the corresponding CVS. And then, the Mode I STA judges the channel list(s) corresponding to the Map ID, which does not correspond to the Map ID included in the CVS among the channel lists of which the Mode I STA possessed in advance (i.e., the Mode I STA possesses a plurality of channel lists and a plurality of Map IDs corresponding to a plurality of the channel lists via a latest Mode I CAQ), as invalid. The Mode I STA can discard the channel list(s) or simply may not use the channel list(s).

The Mode II STA can deliver the information on a plurality of the available channel lists to the Mode I STA in advance via the Mode I CAQ response (a response for the Mode I CAQ request of the Mode I STA or an unsolicited response). The Mode II STA can inform the Mode I STA of whether the preliminarily delivered a plurality of the available channel lists are continuously valid using the CVS. In particular, it is able to represent that the Mode II STA renewals the expiration date of the channel list capable of being used by the Mode I STA on every CVSTimeInterval using the CVS.

In this case, each of the map IDs preliminarily provided in the process of the Mode I CAQ does not need to be mandatorily included in the CVS. In particular, although the Mode II STA should consistently transmit the CVS on every CVSTimeInterval (e.g., 60 seconds), only a Map ID of an available channel in one location can be included in the CVS. The Mode I STA can identify that the available channel list applied in a current location (and current timing point) corresponds to which one of a plurality of the available channel lists obtained via the Mode I CAQ.

And, the Map ID included in the CVS not always corresponds to the channel list currently capable of being used by the Mode I STA. Besides the channel list currently capable of being used by the Mode I STA, the Map ID for a different channel list except the currently available channel list among the channel lists previously transmitted to the Mode I STA can be consistently provided to the Mode I STA via the CVS as well. For instance, as shown in FIG. 6 (b), if an available channel in (P1, R2) is a subset of an available channel in (P1, R1), the operation as mentioned in the above can be performed. For instance, assume a case that a MAP ID of an available channel in (P1, R1) region is 1, 2, 3, the MAP ID of the available channel in (P1, R2) is 1, 2, and the MAP ID of the available channel in (P1, R3) is 1. In this case, if the Mode I STA is currently positioned at the (P1, R1) region, the CVS received by the Mode I STA includes the MAP ID=1, 2, and 3. The MAP ID 1 and 2 correspond to the available channel list in the (P1, R2) region as well. Similarly, among the MAP ID=1, 2, and 3, which are included in the CVS received by the Mode I STA positioned at the (P1, R1) region, the MAP ID=1 corresponds to the available channel list (i.e., a different channel list) in the (P1, R3) region as well.

As mentioned in the foregoing description, the CVS may include a currently available channel list and a plurality of Map ID fields corresponding to the different channel lists. In particular, including a Map ID in the CVS can be called a renewal of a channel list corresponding to the corresponding Map ID. By performing a renewal of the corresponding channel list using the CVS from a transmission timing of the channel list on every CVSTimeInterval, it is able to manage the corresponding channel list to be consistently valid. Or, among a plurality of the Map IDs corresponding to a plurality of the channel lists preliminarily provided to the Mode I STA, a Map ID not included in a previous CVS can be included in a later CVS. For instance, in case that the Mode I STA does not discard a channel list corresponding to the Map ID not included in the CVS and does not simply use the channel list, the Mode I STA can perform a renewal for the channel list, which is not used before receiving a latest CVS although the Mode I STA possesses the channel list. In this case, the Mode I STA may simply operate in a manner that the Mode I STA uses a channel list(s) corresponding to the Map ID(s) included in the latest CVS and does not use the channel list(s) corresponding to the Map ID(s) not included in the latest CVS.

Meanwhile, if a channel list is modified due to a movement of the Mode II STA, the Mode II STA can inform the Mode I STA of a modified available channel list (e.g., in a manner of an announcement) using the Mode I CAQ. Yet, if the modified available channel list is a subset of the available channel list prior to the modification and there exists a channel list coincident with the modified available channel list among the channel lists corresponding to the Map ID included in the CVS, the Mode II STA does not inform the Mode I STA of the modified available channel list via the Mode I CAQ but informs the Mode I STA of which channel is not valid anymore via the CVS. In this case, the Map ID of the channel list including the channel, which is not valid anymore, is not included in the CVS. Having received the aforementioned CVS, the Mode I STA judges that the channel list corresponding to the Map ID, which is not included in the CVS, is not valid anymore. And then, the Mode I STA does not use (or may discard the channel list) the channel list. In particular, in terms of the Mode I STA, the channel list capable of being used by the Mode I STA is a union of the channel list corresponding to the Map ID included in the lately received CVS.

For instance, the Mode I STA can obtain available channel information on multiple locations in advance using the Mode I CAQ message such as the example of FIG. 9. If a location of the Mode I STA is modified, the Mode I STA can continuously check (i.e., tracking) whether a plurality of available channel lists for the multiple locations are valid in a manner of not using a new Mode I CAQ message in a modified location but receiving the CVS (e.g., the CVS of FIG. 10) only. If the channel list capable of being used by the Mode I STA is changed since the location of the Mode I STA and/or the Mode II STA is modified, the Mode II STA can transmit a Map ID of the modified channel list to the Mode I STA via the CVS (in this case, assume that the channel list corresponding to the corresponding Map ID is provided to the Mode I STA in advance using the Mode I CAQ).

Having received the CVS, the Mode I STA can check whether there exists a channel list corresponding to the Map ID received via the CVS among the available channel list in the multiple locations obtained in advance via the Mode I CAQ. If the Mode I STA possesses the available channel list corresponding to the Map ID included in the CVS, the Mode I STA can use the channel list currently used in a manner of replacing into a channel list corresponding to the Map ID included in the CVS. If the Mode I STA does not possess the available channel list corresponding to the Map ID included in the CVS or the Map ID of the CVS is set to 0, the Mode I STA can receive a new available channel list from the Mode II STA. The Mode I STA can obtain a new available channel list by receiving a Mode I CAQ response from the Mode II STA with/without a request. This Mode I CAQ process can be called an updated Map ID obtaining process or a Map ID reset process.

In case of the Mode I CAQ as a usage of updating a Map ID, if the Mode II STA receives a Mode I CAQ request message, the Mode II STA transmits an updated Map ID and available channel list information corresponding to the updated Map ID to the Mode I STA via a Mode I CAQ response message. Having received the Mode I CAQ response message, the Mode I STA can add the updated Map ID and the available channel list corresponding to the updated Map ID to the conventional valid available channel lists.

Meanwhile, after receiving the CVS of which the Map ID=0, the Map ID of the channel list newly received via the Mode I CAQ response may have a number identical to the Map ID of the conventional channel list. In this case, the conventional channel list can be replaced (or reset) in a manner of matching the newly obtained channel list with the corresponding Map ID.

In the foregoing description, the Mode I STA obtains an available channel list in one or more locations and corresponding Map ID in advance using the latest Mode I CAQ process and a method of informing the Mode I STA of validity of the obtained available channel list via the CVS is described.

Subsequently, a case of newly configuring the available channel list itself, which is obtained using the Mode I CAQ process, is explained. For instance, it is able to assume a case that the Mode II STA moves the available channel list to not a location of which the Mode II STA obtained the available channel list in advance but a new location or a case that the Mode II receives a notification from the DB notifying that the available channel list is updated. In this case, although the Mode II STA transmits CVS to the Mode I STA, since the Mode II STA cannot be sure the validity of the available channel list corresponding to the Map ID included in the CVS, it is necessary for the Mode II STA to have a process of obtaining the available channel list again. Hence, the Mode II STA can obtain a new available channel list (an available channel list in a modified location or an available channel list updated in the DB although there is no location change) by accessing the DB again.

If the available channel list newly obtained by the Mode II STA from the DB is not matched with the conventional available channel list, the Mode II STA can transmit the CVS including the updated Map ID to the Mode I STA. Since the Mode I STA does not have a channel list of the Map ID included in the CVS, the Mode I STA transmits a Mode I CAQ request message to the Mode II STA and can receive a Mode I CAQ response message including the information on the updated available channel list from the Mode II STA.

Or, if the available channel list newly obtained by the Mode II STA from the DB is matched with the conventional available channel list, the Mode II STA can transmit the CVS using the conventional Map ID as it is. Having received the CVS, the Mode I STA does not perform a Mode I CAQ request.

In the following description, a Mode I CAQ process for one or more locations according to the aforementioned example of the present invention and various examples to which a CVS transmission and reception process is applied are explained.

Figure 11:
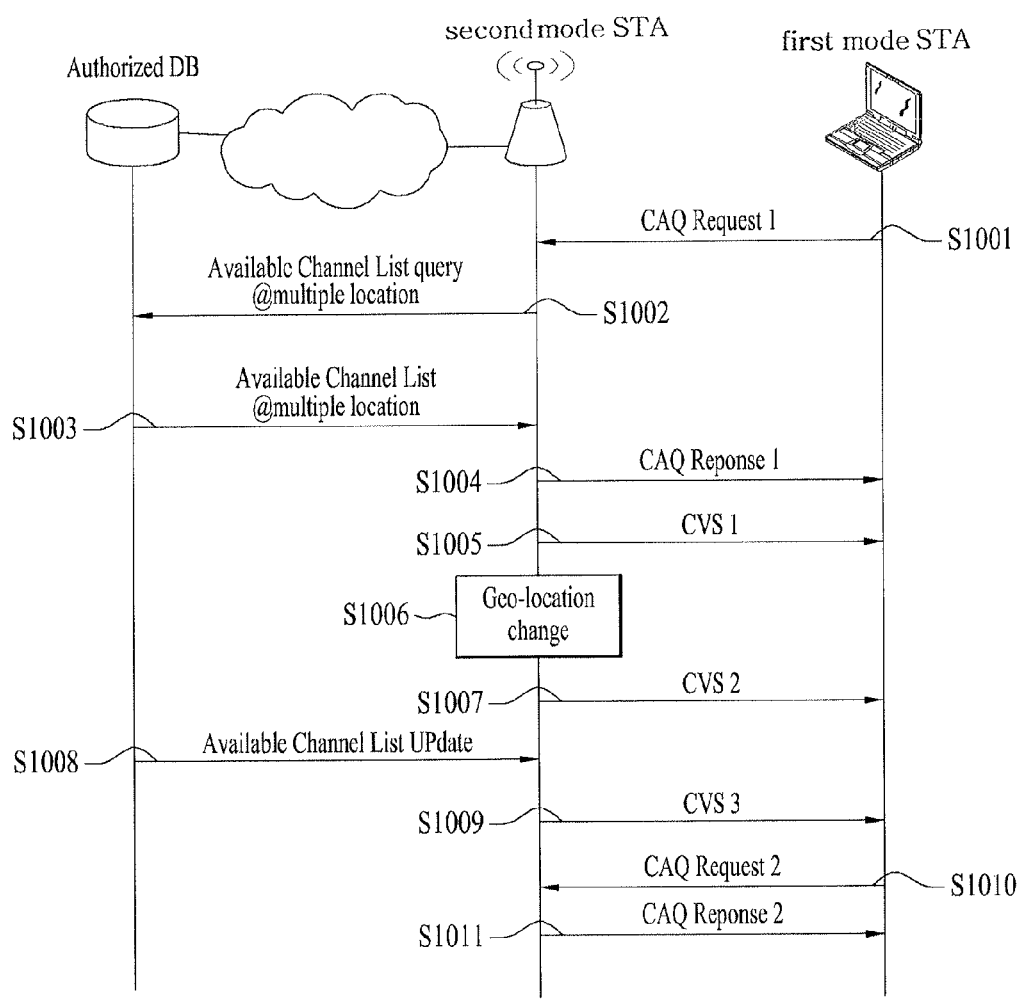
FIG. 11 is a flowchart indicating a Mode I CAQ process and a CVS transceiving process according to one example of the present invention.

FIG. 11 is a flowchart indicating a Mode I CAQ process and a CVS transceiving process according to one example of the present invention. In the example of FIG. 11, assume that the Mode I STA is positioned within the coverage of the Mode II STA and the Mode II STA is capable of exchanging information with an authorized DB via the internet and the like.

In the step S1001, the Mode I STA can transmit a CAQ Request 1 to the Mode II STA and this corresponds to a Mode I CAQ request.

In the step S1002, the Mode II STA can transmit an available channel list query for multiple locations to the authorized DB (e.g., DB). This corresponds to a Mode II CAQ request. For instance, the Mode II STA is positioned at a P1 in the example of FIG. 6 (a) and can query a channel list available in 2 locations (i.e., (P1, R1) and (P2, R2)) to the DB.

In the step S1003, the DB can deliver an available channel list for multiple locations to the Mode II STA in response to the query of the Mode II STA. this corresponds to a Mode II CAQ response. For instance, the available channel list provided by the DB to the Mode II STA assumes a case that the channel number of the channels capable of being used in (P1, R1) is {1, 2, and 3} and the channel number of the channels capable of being used in (P2, R2) is {3, 4, and 5}.

In the step S1004, the Mode II STA can transmit a channel list capable of being used by the Mode I STA among the available channel list for the multiple locations obtained from the DB to the Mode I STA. This corresponds to a Mode I CAQ response. For instance, the information included in the CAQ Response 1 can be summarized in Table 10 as follows.

TABLE 10

| CAQ response 1 | | |
|---|---|---|
| Location | Map ID | Channel number |
| (P1, R1) | 1 | {1, 2, 3} |
| (P2, R2) | 2 | {3, 4, 5} |

Meanwhile, although the step S1002 may be initiated by the step S1001, the Mode II STA can transmit the available channel list query to the DB despite that the step S1001 is not performed. And, if the Mode II STA already obtained the available channel list for the multiple locations from the DB, the Mode II STA can perform the Mode I CAQ response of the S1004 in response to the Mode I CAQ request without performing the Mode II CAQ process of the S1002 and the S1003. Or, the Mode II STA may deliver the available channel list for the multiple locations to the Mode I STA without performing the S1001 (or, without performing the S1001, the S1002, and the S1003). This corresponds to an unsolicited Mode I CAQ response. As mentioned in the foregoing description, the available channel list for the multiple locations can be transmitted to the Mode I STA in the step S1004 in various situations.

In the step S1005, the Mode II STA can transmit a CVS (CVS1) to the Mode I STA. The CVS1 can include information where Map ID=1 only. Hence, the Mode I STA can determine a channel capable of being used by the Mode I STA where the channel number {1, 2, 3} corresponding to the map ID=1 is available in a current location and current timing point. By doing so, the Mode I STA can perform a WS communication.

In the step S1006, a geo-location change may occur due to a movement of the Mode II STA to a different location. For instance, assume that the Mode II STA stays in the (P1, R1) position before the step S1006 and moves to a (P2, R2) position in the step S1006 (more specifically, assume that the Mode II STA moves to the (P2, R2) position except a part overlapped with the (P1, R1) region). According to the location change, the available channel list may be modified. Since the Mode II STA has already obtained the available channel list in the (P2, R2) position in the step S1003, the Mode II STA does not need to query a new available channel list to the DB due to the location change of the step S1006.

In the step S1007, the Mode II STA can transmit a CVS (CVS2) including a Map ID of an available channel list in a current location to the Mode I STA. The CVS2 can include information where Map ID=2 only. Hence, the Mode I STA can determine a channel capable of being used by the Mode I STA where the channel number {3, 4, 5} corresponding to the map ID=2 is available in a current location and current timing point. By doing so, the Mode I STA can perform a WS communication.

While the Mode II STA is staying in the (P2, R2) region, update of the channel list, which is available in the (P2, R2) position, may occur. In the step S1008, the DB can transmit an updated available channel list to the Mode II STA. This corresponds to an unsolicited Mode II CAQ response. For instance, the updated available channel list received by the Mode II STA in the step S1008 (e.g., channel number {3, 4, 6} in the position (P2, R2)) may be not matched with the available channel list (e.g., channel number {3, 4, 5} in the position (P2, R2)) previously obtained in the step S1003. In this case, the Mode II STA can assign a Map ID to the updated available channel list as shown in the following Table 11.

TABLE 11

| Location | Map ID | Channel number |
|---|---|---|
| (P2, R2) | 3 | {3, 4, 6} |

In the step S1009, the Mode II STA can transmit a CVS (CVS3) to the Mode I STA to inform that the available channel list is updated in the (P2, R2). The CVS3 can include information where Map ID=3 only. In this case, the Mode I STA includes the available channel list where Map ID=1, which is included in the CAQ Response received in the step S1004, and the available channel list where the Map ID=2 only. Hence, when the Mode I STA checks the Map ID included in the received CVS3, since the Mode I STA does not have Map ID=3, the Mode I STA cannot determine an available channel list corresponding to the Map ID=3. Hence, the Mode I STA should obtain new available channel information.

In the step S1010, the Mode I STA can transmit a CAQ Request 2 to the Mode II STA. This corresponds to the Mode I CAQ request.

In the step S1011, the Mode II STA can transmit the CAQ response 2 to the Mode I STA. This corresponds to the Mode I CAQ response. In this case, information of a following Table 12 should be included in the CAQ response 2.

TABLE 12

| CAQ Response 2 | | |
|---|---|---|
| Location | Map ID | Channel number |
| (P2, R2) | 3 | {3, 4, 6} |

Meanwhile, explanation on the aforementioned FIG. 11 can be identically applied to the example of FIG. 6 (b). For instance, S1001 to S1005 and S1007 to S1011 can be identically applied to the example. It can be understood that the channel list is modified due to the movement of the Mode II STA from the (P1, R1) position to the (P1, R2) in the step S1006 (in particular, the channel list is modified when the Mode II STA moves from the (P1, R2) region to the region except the (P1, R1) region).

Figure 12:
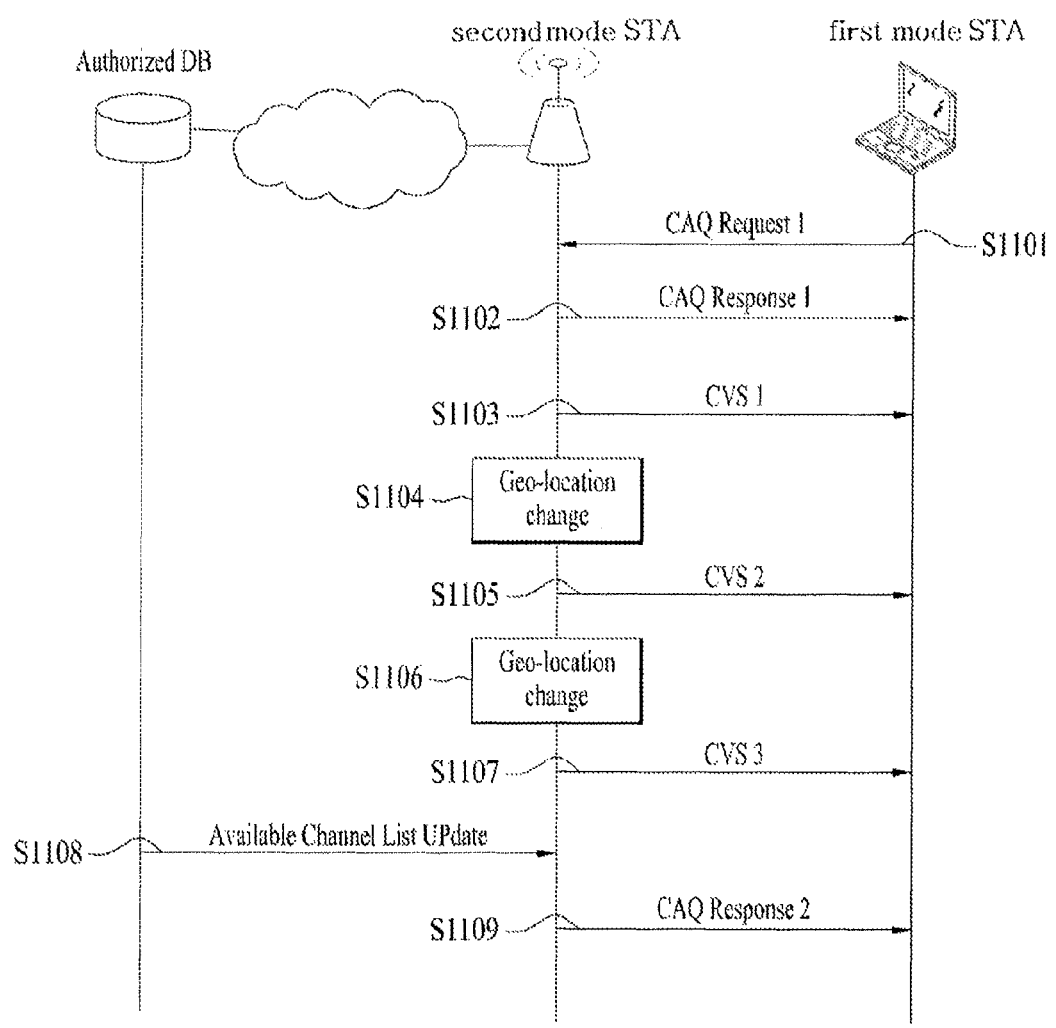
FIG. 12 is a flowchart indicating a Mode I CAQ process and a CVS transceiving process according to a different example of the present invention.

FIG. 12 is a flowchart indicating a Mode I CAQ process and a CVS transceiving process according to a different example of the present invention. In the example of FIG. 12, for a part of which a separate explanation does not exist, the explanation for the example of FIG. 11 can be applied as it is.

In the example of FIG. 12, assume a case that the Mode II STA starts from P1 of the example of FIG. 6 (b) and moves in a manner of passing through (P1, R1) region, (P1, R2) region, and (P1, R3) region. In particular, an anticipated moving path of the Mode II STA is shown in FIG. 6 (b) and assume that the Mode II STA has already obtained a channel list available in the anticipated moving path (for instance, assume that the Mode II STA already obtained available channel lists from the DB).

In the step S1101, the Mode I STA can transmit a Mode I CAQ Request 1 (CAQ Request 1) to the Mode II STA. In the step S1102, the Mode II STA can transmit a Mode I CAQ response (CAQ Response 1) to the Mode I STA. For instance, a channel list available in each location including the anticipated moving path of the Mode II STA can be included in the CAQ Response 1 as shown in the following Table 13.

TABLE 13

| CAQ response 1 | | |
|---|---|---|
| Location | Map ID | Channel number |
| (P1, R1) | 1 | {1, 2, 3} |
| (P1, R2) | 2 | {1, 2} |
| (P1, R3) | 3 | {1} |

As shown in the Table 13, in case of the multiple locations are configured as depicted in FIG. 6 (b), an available channel in a wider region can be set to a subset of an available channel of a narrower region. For instance, when a channel available in wherever in the wider region is determined, since the region is wider, possibility of existence of an incumbent user or interference of a neighboring channel may increase. Yet, this is just an exemplary for the understanding of the present invention. The present embodiment can be applied to various cases where an available channel list in one location becomes a subset of an available channel list in a different location.

The step S1102 can be performed in response to the step S1101 or can be performed by an unsolicited form.

In the step S1103, the Mode II STA can transmit a CVS (CVS1) to the Mode I STA. The CVS1 can include Map ID=1, 2, and 3. Hence, the Mode I STA can determine a channel capable of being used by the Mode I STA where the channel number {1, 2, 3} corresponding to the Map ID=1, 2, and 3 is available in a current location and current timing point (e.g., for CVSTimeInterval). By doing so, the Mode I STA can perform a WS communication.

In the step S1104, a geo-location change occurs due to the movement of the Mode II STA moving to a (P1, R2) position (in particular, in case that the Mode II STA, which exists in the (P1, R1) region, moves to the (P1, R2) region in a manner of getting out an R1 radius) and an available channel list can be modified according to the movement of the Mode II STA. In the step S1105, the Mode II STA can transmit a CVS (CVS2) to inform the Mode I STA of the change of the available channel list. The CVS2 can include the Map ID=2 and 3. Hence, the Mode I STA can determine a channel capable of being used by the Mode I STA where the channel number {1, 2} corresponding to the Map ID=2 and 3 is available in a current location and current timing point (e.g., for CVSTimeInterval). By doing so, the Mode I STA can perform a WS communication. And, the Mode I STA simply does not use or can discard the channel number {3} not corresponding to the Map ID of the CVS.

In the step S1106, a geo-location change occurs due to the movement of the Mode II STA moving to a (P1, R3) position (in particular, in case that the Mode II STA, which exists in the (P1, R2) region, moves to the (P1, R3) region in a manner of getting out an R2 radius) and an available channel list can be modified according to the movement of the Mode II STA. In the step S1107, the Mode II STA can transmit a CVS (CVS3) to inform the Mode I STA of the change of the available channel list. The CVS3 can include the Map ID=3. Hence, the Mode I STA can determine a channel capable of being used by the Mode I STA where the channel number {1} corresponding to the Map ID=3 is available in a current location and current timing point (e.g., for CVSTimeInterval). By doing so, the Mode I STA can perform a WS communication. And, the Mode I STA simply does not use or can discard the channel number {2, 3} not corresponding to the Map ID of the CVS.

Meanwhile, While the Mode II STA is staying in the (P1, R3) region, update of the channel list, which is available in the (P1, R3) position, may occur. In the step S1108, the DB can transmit an updated available channel list to the Mode II STA. This corresponds to an unsolicited Mode II CAQ response. For instance, the updated available channel list received by the Mode II STA in the step S1108 (e.g., channel number {4, 5} in the position (P1, R3)) may be not matched with the available channel list (e.g., channel number {1} in the position (P1, R3)) previously obtained. In this case, the Mode II STA can assign a Map ID to the updated available channel list as shown in the following Table 14.

TABLE 14

| Location | Map ID | Channel number |
|---|---|---|
| (P1, R3) | 4 | {4, 5} |

In the step S1109, the Mode II STA can transmit an unsolicited Mode I CAQ response (CAQ Response 2) to the Mode I STA to inform that the available channel list is updated. In this case, information of a following Table 15 should be included in the CAQ Response 2.

TABLE 15

| CAQ Response 2 | | |
|---|---|---|
| Location | Map ID | Channel number |
| (P3, R3) | 4 | {4, 5} |

Meanwhile, explanation on the aforementioned FIG. 12 can be identically applied to the example of FIG. 6 (a). For instance, it can be understood that the channel list is modified due to the movement of the Mode II STA from the (P1, R1) position to the (P2, R2) in the step S1104 (in particular, the channel list is modified when the Mode II STA moves from the (P2, R2) region to the region except the (P1, R1) region). In this case, the available channel information in (P2, R2) may correspond to a subset of the available channel information in (P1, R1). As mentioned earlier, a CVS scheme for informing the validity of the available channel in the R2 radius except the R1 radius can be used.

For the method of transceiving a CAQ request/response and a CVS according to one embodiment of the present invention explained in relation to FIG. 11 and FIG. 12, each of the items explained by the various embodiments of the present invention can be independently applied or two or more embodiments can be implemented in a manner of being simultaneously applied. For clarity, duplicated content is omitted.

Figure 13:
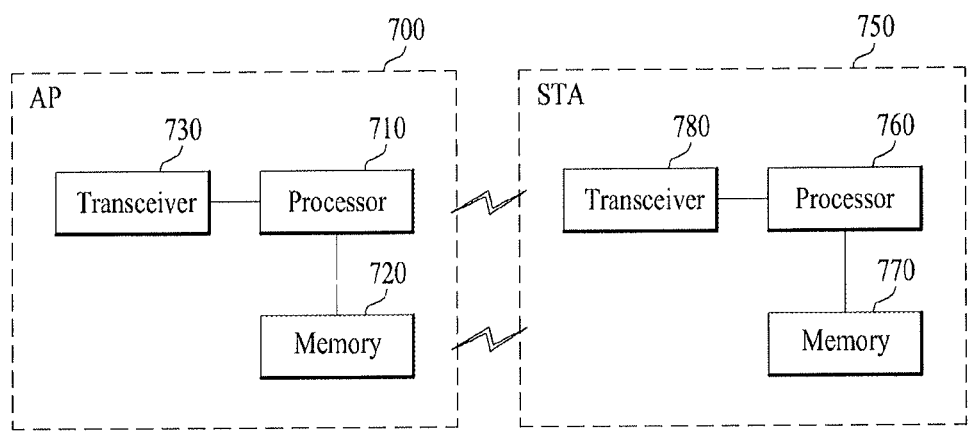
FIG. 13 is a diagram for explaining a detail configuration of a processor of a wireless device according to one embodiment of the present invention.

FIG. 13 is a block diagram of a wireless device configuration according to one embodiment of the present invention.

An AP 700 can include a processor 710, a memory 720, and a transceiver 730. An STA 750 can include a processor 760, a memory 770, and a transceiver 780. The transceiver 730/780 can transmit/receive a radio signal. For instance, the transceiver can implement a physical layer according to an IEEE 802 system. The processor 710/760 can implement a physical layer and/or a MAC layer according to an IEEE 802 system in a manner of being connected to the transceiver 730/760.

The processor 710 of the AP 700 can be configured to determine WSM for the STA 750. The transceiver 730 of the AP 700 can be configured to transmit information on the WSM to the STA 750 and configured to transmit a CVS frame including a Map ID of a currently valid WSM to the STA 750 after the WSM is transmitted. Meanwhile, the transceiver 780 of the STA 750 can be configured to receive the information on the WSM from the AP 700 and configured to receive a CVS frame including a Map ID of a currently valid WSM from the AP 700 after the WSM information is received. The processor 760 of the STA 750 can compare a value of the Map ID field included in the CVS frame with a Map ID possessed by the STA 750. In this case, a field for indicating a time interval of which the CVS frame is transmitted is included in the CVS frame. The CVS frame can be transmitted on every corresponding transmission time interval. Besides, the processor 710 of the AP 700 can be configured to control the AP 700 to perform an operation according to various embodiments of the present invention related to the CAQ request/response and the CVS transmission and reception.

And, a module for implementing the operation of the AP and the STA according to the aforementioned various embodiments of the present invention is stored in the memory 720/770 and can be executed by the processor 710/760. The memory 720/770 is included in the inside of the processor 710/760 or is installed in the external of the processor 710/760. The memory can be connected to the processor 710/760 by a well-known means.

For the aforementioned detail configuration of the AP device and the STA device, each of the items explained by the various embodiments of the present invention can be independently applied or two or more embodiments can be implemented in a manner of being simultaneously applied. For clarity, duplicated content is omitted.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. For instance, those skilled in the art can use each component described in the aforementioned embodiments in a manner of combining it with each other. Hence, the present invention may be non-limited to the aforementioned embodiments of the present invention and intends to provide a scope matched with principles and new characteristics disclosed in the present invention.

INDUSTRIAL APPLICABILITY

Although various embodiments of the present invention are described in a manner of mainly concerning IEEE 802.11 system, the embodiments can be applied to various mobile communication systems where a CAQ request/response and a CVS transmission/reception are performed in a whitespace band in the same manner.

What is claimed is:

1. A method of receiving a verification signal, which is received by a first mode station (STA) from a second mode STA in a wireless communication system, the method comprising:
receiving information on a white space map (WSM) from the second mode STA before operating in a white space band;
receiving a contact verification signal (CVS) frame containing a map identifier (Map ID) of a currently valid WSM from the second mode STA; and
comparing a value of the Map ID field contained in the CVS frame with a Map ID possessed by the first mode STA,
wherein a time interval of the valid WSM is reinitialized based on the CVS frame when the value of the Map ID field contained in the CVS frame is identical to the Map ID possessed by the first mode STA.

2. The method of claim 1, wherein:
the CVS frame further comprises a field indicating a time interval of which the CVS frame is transmitted from the second mode STA; and
the CVS frame is received on the every time interval of a CVS transmission.

3. The method of claim 2, wherein the field indicating the time interval comprises a variable indicating a CVS transmission time interval.

4. The method of claim 1, further comprising, if the CVS frame is not received on the every time interval, transmitting a channel availability query (CAQ) to the second mode STA.

5. The method of claim 4, further comprising, if an updated WSM is not received, terminating a radio transmission.

6. The method of claim 1, further comprising, if the Map ID is different from each other according to a comparison result, judging that the WSM is not valid.

7. The method of claim 6, further comprising, if it is judged that the WSM is not valid, transmitting a CAQ request frame to the second mode STA.

8. The method of claim 7, further comprising receiving a CAQ response frame containing an updated WSM from the second mode STA.

9. The method of claim 1, wherein the second mode STA corresponds to an STA that has provided the WSM to the first mode STA.

10. The method of claim 1, wherein the Map ID field contained in the CVS frame indicates whether the WSM is modified.

11. The method of claim 1, wherein the CVS frame comprises the Map ID of the WSM for multiple locations.

12. The method of claim 1, wherein a variable indicating a CVS enablement for the first and the second mode STA is set to true.

13. A method of transmitting a verification signal, which is transmitted by a second mode station (STA) to a first mode STA in a wireless communication system, the method comprising:
transmitting information on a white space map (WSM) to the first mode STA before the first mode STA operates in a white space band; and
transmitting a contact verification signal (CVS) containing a map identifier (Map ID) of a currently valid WSM to the first mode STA,
wherein a value of the Map ID field contained in the CVS frame and a Map ID possessed by the first mode STA are compared with each other in the first mode STA, and
wherein a time interval of the valid WSM is reinitialized based on the CVS frame when the value of the Map ID field contained in the CVS frame is identical to the Map ID possessed by the first mode STA.

14. A first mode station (STA) device configured to receive a verification signal from a second mode station (STA) in a wireless communication system, the first mode station device comprising:
a transceiver configured to:
receive information on a white space map (WSM) from the second mode STA before operating in a white space band; and
receive a contact verification signal (CVS) frame containing a map identifier (Map ID) of a currently valid WSM from the second mode STA; and
a processor configured to compare a value of the Map ID field contained in the CVS frame with a Map ID possessed by the first mode STA,
wherein a time interval of the valid WSM is reinitialized based on the CVS frame when the value of the Map ID field contained in the CVS frame is identical to the Map ID possessed by the first mode STA.

15. A second mode station (STA) device configured to transmit a verification signal to a first mode station (STA) in a wireless communication system, the second mode station device comprising:
a processor configured to determine a white space map (WSM) for the first mode STA; and a transceiver configured to:
> transmit information on the white space map (WSM) to the first mode STA before the first mode STA operates in a white space band; and
> transmit a contact verification signal (CVS) containing a map identifier (Map ID) of a currently valid WSM to the first mode STA,
> wherein a value of the Map ID field contained in the CVS frame and a Map ID possessed by the first mode STA are compared with each other in the first mode STA, and
> wherein a time interval of the valid WSM is reinitialized based on the CVS frame when the value of the Map ID field contained in the CVS frame is identical to the Map ID possessed by the first mode STA.

* * * * *